(12) United States Patent
Liang et al.

(10) Patent No.: US 7,679,813 B2
(45) Date of Patent: Mar. 16, 2010

(54) ELECTROPHORETIC DISPLAY WITH DUAL-MODE SWITCHING

(75) Inventors: Rong-Chang Liang, Cupertino, CA (US); Jerry Chung, Mountain View, CA (US)

(73) Assignee: Sipix Imaging, Inc., Fremont, CA (US)

( * ) Notice: Subject to any disclaimer, the term of this patent is extended or adjusted under 35 U.S.C. 154(b) by 0 days.

(21) Appl. No.: 11/345,820

(22) Filed: Feb. 1, 2006

(65) Prior Publication Data

US 2006/0125779 A1 Jun. 15, 2006

Related U.S. Application Data

(60) Division of application No. 10/367,098, filed on Feb. 14, 2003, now Pat. No. 7,038,670, which is a continuation-in-part of application No. 10/222,036, filed on Aug. 16, 2002, now Pat. No. 7,046,228.

(60) Provisional application No. 60/313,146, filed on Aug. 17, 2001.

(51) Int. Cl.
*G02B 26/00* (2006.01)
*G09G 3/34* (2006.01)

(52) U.S. Cl. .................. 359/296; 359/290; 359/291; 359/295; 345/107

(58) Field of Classification Search .......... 359/296, 359/290, 291, 292, 295, 298; 345/107, 105; 430/32, 34, 38; 204/478, 485
See application file for complete search history.

(56) References Cited

U.S. PATENT DOCUMENTS 3,612,758 A 10/1971 Evans et al.

(Continued)

FOREIGN PATENT DOCUMENTS

EP 1 089 118 4/2001

(Continued)

OTHER PUBLICATIONS

U.S. Appl. No. 10/367,670, filed Feb. 2003, Liang.

(Continued)

*Primary Examiner*—Ricky L Mack
*Assistant Examiner*—Brandi N Thomas
(74) *Attorney, Agent, or Firm*—Howrey LLP

(57) ABSTRACT

The present invention relates to an improved EPD which comprises both the traditional up/down switching and the in-plane switching modes. In other words, the improved EPD has dual switching modes. The monochrome EPDs of the present invention are capable of displaying highlight color of choice which is different from the text. For example, white background, blue text, and red highlight can be shown in any selected areas of the display. Furthermore, the full color EPDs of the present invention are capable of displaying high contrast images of high color saturation. Both high quality black and white states are possible in the full color displays of the present invention. The EPDs of the present invention do not need complex circuitry design, and are compatible with low cost and high yield roll-to-roll manufacturing processes. The EPD cells of the present invention may have opaque partition walls, or a black matrix top surface of the partition walls or a combination thereof.

53 Claims, 19 Drawing Sheets

U.S. PATENT DOCUMENTS

| | | |
|---|---|---|
| 3,668,106 A | 6/1972 | Ota |
| 3,697,679 A | 10/1972 | Hathaway |
| 3,892,568 A | 7/1975 | Ota |
| 4,071,430 A | 1/1978 | Liebert |
| 4,093,534 A | 6/1978 | Carter et al. |
| 4,285,801 A | 8/1981 | Chiang |
| 4,298,448 A | 11/1981 | Muller et al. |
| 4,680,103 A | 7/1987 | Beilin et al. |
| 4,741,988 A | 5/1988 | Van der Zande et al. |
| 4,995,718 A | 2/1991 | Jachimowicz et al. |
| 5,132,820 A | 7/1992 | Someya et al. |
| 5,159,478 A * | 10/1992 | Akiyama et al. ............ 349/112 |
| 5,276,438 A | 1/1994 | DiSanto et al. |
| 5,279,511 A | 1/1994 | DiSanto et al. |
| 5,345,251 A | 9/1994 | DiSanto et al. |
| 5,378,574 A | 1/1995 | Winnik et al. |
| 5,380,362 A | 1/1995 | Schubert |
| 5,403,518 A | 4/1995 | Schubert |
| 5,573,711 A | 11/1996 | Hou et al. |
| 5,589,100 A | 12/1996 | Grasso et al. |
| 5,699,097 A | 12/1997 | Takayama et al. |
| 5,745,094 A | 4/1998 | Gordon, II et al. |
| 5,835,174 A | 11/1998 | Clikeman et al. |
| 5,892,497 A | 4/1999 | Robertson |
| 5,914,806 A | 6/1999 | Gordon, II et al. |
| 5,930,026 A | 7/1999 | Jacobson et al. |
| 5,961,804 A | 10/1999 | Jacobson et al. |
| 5,976,405 A | 11/1999 | Clikeman et al. |
| 5,980,719 A | 11/1999 | Cherukuri et al. |
| 5,982,346 A | 11/1999 | Sheridon et al. |
| 6,017,584 A | 1/2000 | Albert et al. |
| 6,037,058 A | 3/2000 | Clikeman et al. |
| 6,052,112 A * | 4/2000 | Tanaka et al. ............... 345/596 |
| 6,067,185 A | 5/2000 | Albert et al. |
| 6,111,598 A | 8/2000 | Faris |
| 6,113,810 A | 9/2000 | Hou et al. |
| 6,120,588 A | 9/2000 | Jacobson |
| 6,120,839 A | 9/2000 | Comiskey |
| 6,172,798 B1 | 1/2001 | Albert et al. |
| 6,184,856 B1 | 2/2001 | Gordon, II et al. |
| 6,198,809 B1 | 3/2001 | Disanto et al. |
| 6,252,624 B1 | 6/2001 | Yuasa et al. |
| 6,312,304 B1 | 11/2001 | Duthaler et al. |
| 6,319,381 B1 * | 11/2001 | Nemelka ..................... 204/485 |
| 6,327,072 B1 | 12/2001 | Comiskey et al. |
| 6,337,761 B1 | 1/2002 | Rogers et al. |
| 6,373,461 B1 | 4/2002 | Hasegawa et al. |
| 6,377,387 B1 | 4/2002 | Duthaler et al. |
| 6,392,786 B1 | 5/2002 | Albert |
| 6,445,374 B2 | 9/2002 | Albert et al. |
| 6,524,153 B1 | 2/2003 | Ikeda et al. |
| 6,525,865 B2 | 2/2003 | Katase |
| 6,538,801 B2 | 3/2003 | Jacobson et al. |
| 6,545,797 B2 | 4/2003 | Chen et al. |
| 6,549,327 B2 | 4/2003 | Foucher et al. |
| 6,597,340 B1 * | 7/2003 | Kawai ........................ 345/107 |
| 6,611,100 B1 | 8/2003 | Moore |
| 6,639,580 B1 * | 10/2003 | Kishi et al. ................. 345/107 |
| 6,650,462 B2 | 11/2003 | Katase |
| 6,672,921 B1 | 1/2004 | Liang et al. |
| 6,693,620 B1 | 2/2004 | Herb et al. |
| 6,704,133 B2 | 3/2004 | Gates et al. |
| 6,721,083 B2 | 4/2004 | Jacobson et al. |
| 6,729,718 B2 | 5/2004 | Goto et al. |
| 6,750,844 B2 | 6/2004 | Nakanishi |
| 6,751,007 B2 | 6/2004 | Liang et al. |
| 6,829,078 B2 * | 12/2004 | Liang et al. ................. 359/296 |
| 6,850,355 B2 * | 2/2005 | Liang et al. ................. 359/296 |
| 6,859,302 B2 | 2/2005 | Liang et al. |
| 6,885,495 B2 | 4/2005 | Liang et al. |
| 6,930,818 B1 | 8/2005 | Liang et al. |
| 6,933,098 B2 | 8/2005 | Chan-Park et al. |
| 7,038,670 B2 | 5/2006 | Liang et al. |
| 7,046,228 B2 | 5/2006 | Liang et al. |
| 2001/0008241 A1 | 7/2001 | Moore |
| 2001/0009352 A1 | 7/2001 | Moore |
| 2001/0030639 A1 | 10/2001 | Goden |
| 2002/0033792 A1 | 3/2002 | Inoue |
| 2002/0036616 A1 | 3/2002 | Inoue |
| 2002/0089495 A1 | 7/2002 | Matsuura et al. |
| 2002/0126249 A1 | 9/2002 | Liang et al. |
| 2002/0150827 A1 | 10/2002 | Kawai et al. |
| 2002/0171620 A1 | 11/2002 | Gordon et al. |
| 2002/0188053 A1 | 12/2002 | Zang et al. |
| 2003/0002132 A1 | 1/2003 | Foucher et al. |
| 2003/0095094 A1 | 5/2003 | Goden |
| 2003/0107631 A1 | 6/2003 | Goto et al. |
| 2003/0132908 A1 | 7/2003 | Herb et al. |
| 2003/0151029 A1 | 8/2003 | Hsu et al. |
| 2003/0169227 A1 | 9/2003 | Chen et al. |
| 2003/0207963 A1 | 11/2003 | Chen et al. |
| 2004/0032389 A1 | 2/2004 | Liang et al. |
| 2004/0051935 A1 | 3/2004 | Katase |
| 2004/0112525 A1 | 6/2004 | Pereira et al. |
| 2004/0113884 A1 | 6/2004 | Albert et al. |
| 2004/0136048 A1 | 7/2004 | Arango et al. |
| 2004/0179259 A1 | 9/2004 | Fujii et al. |
| 2004/0190115 A1 | 9/2004 | Liang et al. |
| 2004/0201567 A1 | 10/2004 | Yu et al. |
| 2005/0007651 A1 | 1/2005 | Liang et al. |

FOREIGN PATENT DOCUMENTS

| | | |
|---|---|---|
| JP | S49-005598 | 1/1974 |
| JP | S49-24695 | 3/1974 |
| JP | 59-171930 | 9/1984 |
| JP | 11-202804 | 7/1999 |
| KR | 2001-45469 | 6/2001 |
| WO | WO 99/53373 | 10/1999 |
| WO | WO 99/56171 | 11/1999 |
| WO | WO 00/60410 | 10/2000 |
| WO | WO 00/77570 | 12/2000 |
| WO | WO 01/67170 | 9/2001 |
| WO | WO 02/073304 | 11/2002 |
| WO | WO 2004/074912 | 9/2004 |
| WO | PCT/US2004/004538 | 12/2004 |
| WO | PCT/US2004/004711 | 12/2004 |

OTHER PUBLICATIONS

Office Action U.S. Appl. No. 10/367,098, filed Jan. 2005, USPTO.
Office Action U.S. Appl. No. 10/367,595, filed Mar. 2005, USPTO.
Allen, K. (Oct. 2003). Electrophoretics Fulfilled. *Emerging Displays Review: Emerging Display Technologies, Monthly Report*—Oct. 2003, 9-14.
Bardsley, J.N. & Pinnel, M.R. (Nov. 2004) Microcup™ Electrophoretic Displays. *USDC Flexible Display Report*, 3.1.2. pp. 3-12-3-16.
Chaug, Y.S., Haubrich, J.E., Sereda, M. and Liang, R.C. (Apr. 2004,) Roll-to-Roll Processes for the Manufacturing of Patterned Conductive Electrodes on Flexible Substrates. *Mat. Res. Soc. Symp. Proc.*, vol. 814, I9.6.1.
Chen, S.M. (Jul. 2003,) The Applications for the Revolutionary Electronic Paper Technology. *OPTO News & Letters*, 102, 37-41. (in Chinese, English abstract attached).
Chen, S.M. (May 2003,) The New Applications and the Dynamics of Companies. *TRI.* 1-10. (In Chinese, English abstract attached).
Chung, J., Hou, J., Wang, W., Chu, L.Y., Yao, W., & Liang, R.C. (Dec. 2003,). Microcup(R) Electrophoretic Displays, Grayscale and Color Rendition. *IDW*, AMD2/EP1-2, 243-246.
Cominsky et al., <<An Electroophoretic Ink for All-Printed Reflective Electronic Displays >>, Letters to Nature, pp. 253-255 (1998).
Dalisa, A.L. << Electrophoretic Display Technology >>, IEEE Transactions of Electron Devices, pp. 827-834, (Jul. 1977).

Drzaic, P., << Liquid Crystal Dispersion >>, The PDLC Paradigm, pp -9, (1995).

Harbour et al, << Subdivided Electrophoretic Display >>, Xerox Disclosure Journal, vol. 4, No. 6 (1979).

Harvey, << Replication Techniques for Micro-Optics >>, SPIE, vol. 3099, pp. 76-82 (1997).

Ho, Candice. (Feb. 1, 2005) *Microcupt® Electronic Paper Device and Applicaiton*. Presentation conducted at USDC 4th Annual Flexible Display Conference 2005.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Hoper and Novotny, << An Electrophoretic Display, Its Properties, Model, and Addressing >>, IEEE Trans. Electr. Devices, vol. ED-26, No. 8, pp. 1148-1152, (1979).

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Kishi et al., << Develoment of In-Plane EPD >>, SID 00 Digest, pp. 24-27 (2000).

Lee, H., & Liang, R.C. (Jun. 2003) SiPix Microcup(R) Electronic Paper—An Introduction. *Advanced Display*, Issue 37, 4-9 (in Chinese, English abstract attached).

Lewis et al << Gravitational, Inter-Particle-Electrode Forces in Electrophoretic Display >>, Proceedings of the SID, vol. 18/3&4, (1977).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest*, 20.1.

Liang, R.C., Hou, J.; & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology EXPO & Conference.

Liang, R.C., & Tseng, S. (Feb. 2003). *Microcup(R) LCD, An New Type of Dispersed LCD by a Roll-to-Roll Manufacturing Process*. Paper presented at the IDMC, Taipei, Taiwan.

Murau, P. "Characteristics of an X-Y Addressable Electrophoretic Image Display (EPID)", *SID Digest*, 141 (1984).

Murau, P., et al, "The Understanding and Elimination of Some Suspension Instabilities in an Electrophoretic Display", J. Appl. Phy., 49 (9), (1978).

Nakamura et al., "Development of Electrophoretic Display Using Microcapsulated Suspension", SID 98 Digest, pp. 1014-1017 (1998).

Nikkei Microdevices. (Dec. 2002) Newly-Developed Color Electronic Paper Promises—Unbeatable Production Efficiency. *Nikkei Microdevices*, 3. (in Japanese, with English translation).

Ota et al., "Electrophoretic Image Display EPID Panel", Proceedings of the IEEE, vol. 1, No. 7 (1973).

Singer, B. et al "An X-Y Addressable Electrophoretic Display", *Proceeding of the S.I.D.*, vol. 18/3 & 4, 255-266 (1977).

Slafer et al., << Continuous Manufacturing of Thin Cover Sheet Optical Media >>, SPIE, vol. 1663, pp. 324-335 (1992).

Swanson et al., << High Performance EPD's >> SID 00 Digest, pp. 29-31 (2000).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup™ Electronic Paper and the Converting Processes. *Advanced Display*, Issue 43, 48-51.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M.Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging*, SPIE vol. 5289, 102-108.

Zang, H.M., & Liang, R.C. (2003) Microcup Electronic Paper by Roll-to-Roll Manufacturing Processes. *The Spectrum*, 16(2), 16-21.

Office Action of U.S. Appl. No. 11/787,655, mailed on Jul. 3, 2008.

* cited by examiner

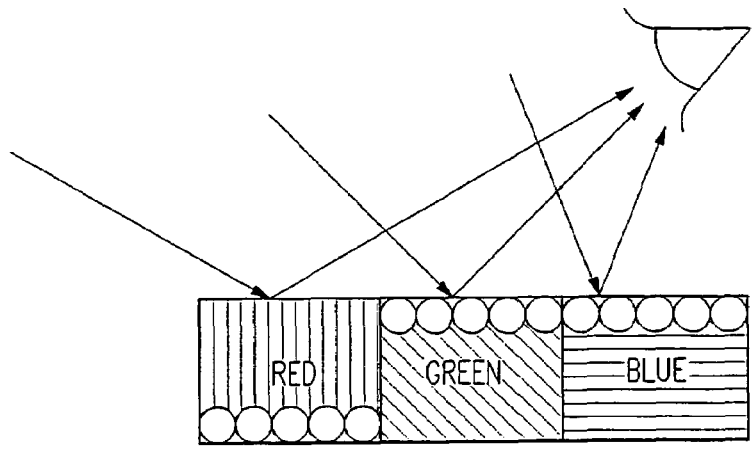
FIG. 1
PRIOR ART
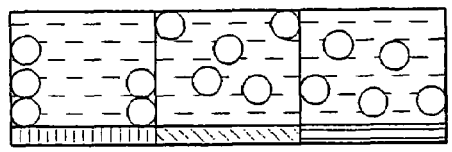
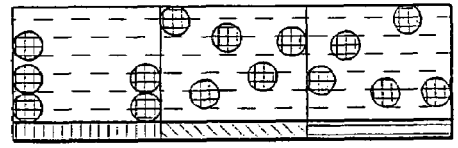
FIG. 2A
PRIOR ART
FIG. 2B
PRIOR ART
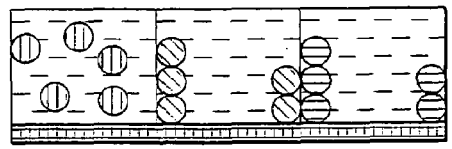
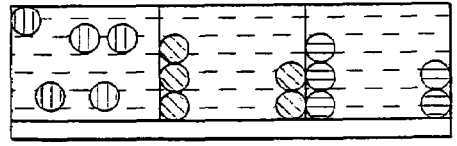
FIG. 2C
PRIOR ART
FIG. 2D
PRIOR ART

WHITE

YELLOW

BLACK

SIDE VIEW

TOP VIEW

SIDE VIEW

TOP VIEW

SIDE VIEW

TOP VIEW

SIDE VIEW

TOP VIEW

COLOR STATE

WHITE STATE

BLACK STATE

TOP VIEW

SIDE VIEW

COLOR STATE

COLOR STATE

WHITE STATE

WHITE STATE

BLACK STATE

BLACK STATE

TOP VIEW

SIDE VIEW

COLOR STATE

COLOR STATE

WHITE STATE

WHITE STATE

BLACK STATE

BLACK STATE

ELECTROPHORETIC DISPLAY WITH DUAL-MODE SWITCHING

CROSS-REFERENCE TO RELATED APPLICATION

This is a divisional application of U.S. patent application Ser. No. 10/367,098 filed on Feb. 14, 2003 now U.S. Pat. No. 7,038,670 which is a continuation-in-part application of U.S. patent application Ser. No. 10/222,036 filed on Aug. 16, 2002 now U.S. Pat. No. 7,046,228, which claims the benefit of U.S. Provisional Application 60/313,146, filed Aug. 17, 2001; the contents of all of which are incorporated herein by reference in their entirety.

BACKGROUND OF THE INVENTION

The electrophoretic display (EPD) is a non-emissive device based on the electrophoresis phenomenon influencing charged pigment particles suspended in a solvent. This general type of display was first proposed in 1969. An EPD typically comprises a pair of opposed, spaced-apart and plate-like electrodes, with spacers predetermining a certain distance between the electrodes. At least one of the electrodes, typically on the viewing side, is transparent. For the passive type of EPDs, row and column electrodes on the top (the viewing side) and bottom plates respectively are needed to drive the displays. In contrast, an array of thin film transistors (TFT) on the bottom plate and a non-patterned transparent conductor plate on the top viewing substrate are required for the active matrix type EPDs. An electrophoretic fluid composed of a colored dielectric solvent and charged pigment particles dispersed therein is enclosed between the two electrodes.

When a voltage difference is imposed between the two electrodes, the pigment particles migrate by attraction to the plate of polarity opposite that of the pigment particles. Thus, the color showing at the transparent plate may be determined by selectively charging the plates to be either the color of the solvent or the color of the pigment particles. Reversal of plate polarity will cause the particles to migrate back to the opposite plate, thereby reversing the color. Intermediate color density (or shades of gray) due to an intermediate level of pigment particles attracted to the transparent plate may be obtained by controlling the plate charge through a range of voltages. No backlight is needed in this type of reflective EPD display, although it may be optionally added to improve the display viewability in the dark.

EPDs of different pixel or cell structures have been reported previously, for example, the partition-type EPD (see M. A. Hopper and V. Novotny, *IEEE Trans. Electr. Dev.*, 26(8):1148-1152 (1979)) and the microencapsulated EPD (as described in U.S. Pat. No. 5,961,804 and U.S. Pat. No. 5,930,026). Each of these has its own problems as noted below.

In a partition-type EPD, there are partitions between the two electrodes for dividing the space into smaller cells in order to prevent undesired movements of the particles such as sedimentation. However, difficulties are encountered in the formation of the partitions, the process of filling the display with the fluid, enclosing the fluid in the display, and keeping the suspensions of different colors separated from each other. Even more difficult problems are encountered in the development of a roll-to roll manufacturing process for such a partition type of displays.

The microencapsulated EPD has a substantially two dimensional arrangement of microcapsules each having therein an electrophoretic composition of a dielectric fluid and a dispersion of charged pigment particles that visually contrast with the dielectric solvent. The microcapsules are typically prepared in an aqueous solution, and to achieve a useful contrast ratio, their mean particle size is relatively large (50-150 microns). The large microcapsule size results in a poor scratch resistance and a slow response time for a given voltage because a large gap between the two opposite electrodes is required for large capsules. Also, the hydrophilic shell of microcapsules prepared in an aqueous solution typically results in sensitivity to high moisture and temperature conditions. If the microcapsules are embedded in a large quantity of a polymer matrix to obviate these shortcomings, the use of the matrix results in an even slower response time and/or a lower contrast ratio. To improve the switching rate, a charge-controlling agent is often needed in this type of EPDs. However, the microencapsulation process in aqueous solution imposes a limitation on the type of charge-controlling agents that can be used. Other drawbacks associated with the microcapsule system include poor resolution and poor addressability for color applications.

U.S. Pat. No. 3,612,758 discloses another type of EPDs wherein the electrophoretic cells are formed from parallel line reservoirs containing charged pigment particles dispersed in a dielectric solvent. The channel-like electrophoretic cells are covered with, and in electric contact with, transparent conductors. A layer of transparent glass from which side the panel is viewed overlies the transparent conductors.

The use of microchannels, microgrooves or microcolumns to form the EPD array still has problem of undesirable particle sedimentation or creaming along the column direction. In addition, the lack of a seamless, air-pocket free and continuous sealing process to enclose the electrophoretic fluid in between the two electrodes makes the roll-to-roll manufacturing extremely difficult.

An improved EPD technology and a roll-to-roll manufacturing process were recently disclosed in U.S. Pat. Nos. 6,930,818; 6,672,921; and 6,933,098; all of which are incorporated herein by reference. The improved EPD comprises closed cells formed from microcups of well-defined shape, size and aspect ratio and filled with charged pigment particles dispersed in a dielectric solvent and top-sealed with a top-sealing composition by one of the methods as disclosed in U.S. Pat. No. 6,930,818 (corresponding to WO 01/67170) and US Publication No. US 2002-0188053 (corresponding to WO 02/98977), the contents of which are incorporated herein by reference. This improved technology involving microcups allows high image quality in monochrome EPDs. A color display may also be manufactured by using a spatially adjacent array of small pixels formed of microcups filled with dyes of different colors (e.g., red, green or blue). However, there is a major deficiency in this type of system with only the traditional up/down switching mode, that is, the white light reflected from the "turned-off" colored pixels greatly reduces the color saturation of the "turned-on" color. More details in this regard are given in the following "Detailed Description" section.

While this latter deficiency may be remedied by an overlaid shutter device such as a polymer dispersed liquid crystal to switch the "off" pixels to the black state and keep the "on" pixels in the desired color state, the disadvantage of this approach is the high cost of the overlaid device, the high Dmin (which is the minimum optical density of the background) associated with the shutter device, and the complicated driving circuit design.

Alternatively, color displays of the normal up/down switching mode may be prepared by using color filters overlaid on the viewing side of the display. However, dark Dmin and lack of a high quality "white" state are the major problems for reflective color displays using color filters.

The "in-plane" switching concept was disclosed in E. Kishi, et al., "5.1: development of In-Plane EPD", Canon Research Center, SID 00 Digest, pages 24-27 and Sally A. Swanson, et al., "5.2: High Performance EPDs", IBM Almaden Research Center, SID 00 Digest, pages 29-31. In these systems, the color effect is achieved by using a colored background with white or black particles. The disadvantage of these systems is the lack of either high quality "white" or high quality "black" state. More details are also given in the "Detailed Description" section.

Thus, there is still a need for an improved EPD with high quality full color capability that can also be manufactured in an efficient manner, particularly by a roll-to-roll manufacturing process.

SUMMARY OF THE INVENTION

The present invention relates to an improved EPD which comprises both the traditional up/down switching and the in-plane switching modes. In other words, the improved EPD has dual switching modes.

The monochrome EPDs of the present invention are capable of displaying highlight color of choice which is different from the color of the text. For example, white background, blue text, and red highlight can be shown in any selected areas of the display. Furthermore, the full color EPDs of the present invention are capable of displaying high contrast images of high color saturation. Both high quality black and white states are possible in the full color displays of the present invention. The EPDs of the present invention do not need complex circuitry design, and are compatible with low cost and high yield roll-to-roll manufacturing processes.

BRIEF DESCRIPTION OF THE DRAWINGS

It is noted that all figures are shown as schematic and are not to scale.

FIGS. 2A-2D illustrate the lack of true white or true black state in an EPD with only the in-plane switching mode.

DETAILED DESCRIPTION OF THE INVENTION

Unless defined otherwise in this specification, all technical terms are used herein according to their conventional definitions as they are commonly used and understood by those of ordinary skill in the art. The terms "well-defined", "aspect ratio" and "imagewise exposure" are as defined in the co-pending applications identified above.

It is understood that the scope of the present invention encompasses the conventional EPDs and EPDs manufactured from microcups, microchannels, microcapsules and the like.

The term "conventional EPD" refers to any electrophoretic cells known in the art. The electrophoretic cells may be of any shapes and sizes, and the displays include, for example, the partition type displays.

The term "microchannel" refers to the type of electrophoretic cells disclosed in U.S. Pat. No. 3,612,758.

The term "microcup" refers to the cup-like indentations, which may be created by methods such as microembossing or imagewise exposure followed by a development step to remove the unexposed or exposed areas. Likewise, the plural form "microcups" in a collective context may in general refers to the microcup assembly comprising a plurality of such microcups integrally formed or joined to make a structured two-dimensional microcup array. The dimensions of the microcup are disclosed in the co-pending applications identified above.

The term "top-sealing" is intended to refer to a sealing process in which the display cells constructed on a first substrate or electrode layer are filled and top-sealed. In the conventional edge seal process, two substrates or electrode layers and an edge seal adhesive are required to enclose and edge-seal the display fluid in the cell(s). In contrast, in the top-sealing process, the display fluid is enclosed and top-sealed before a second substrate or electrode layer is disposed onto the display cell(s).

The term "Dmax" refers to the maximum achievable optical density of the display.

The term "Dmin" refers to the minimum optical density of the display background.

The term "contrast ratio" is defined as the ratio of the % reflectance of an electrophoretic display at the Dmin state to the % reflectance of the display at the Dmax state.

I. The Disadvantages of Conventional EPDs
  (1) EPD with only Up/Down Switching

Figure 11A:
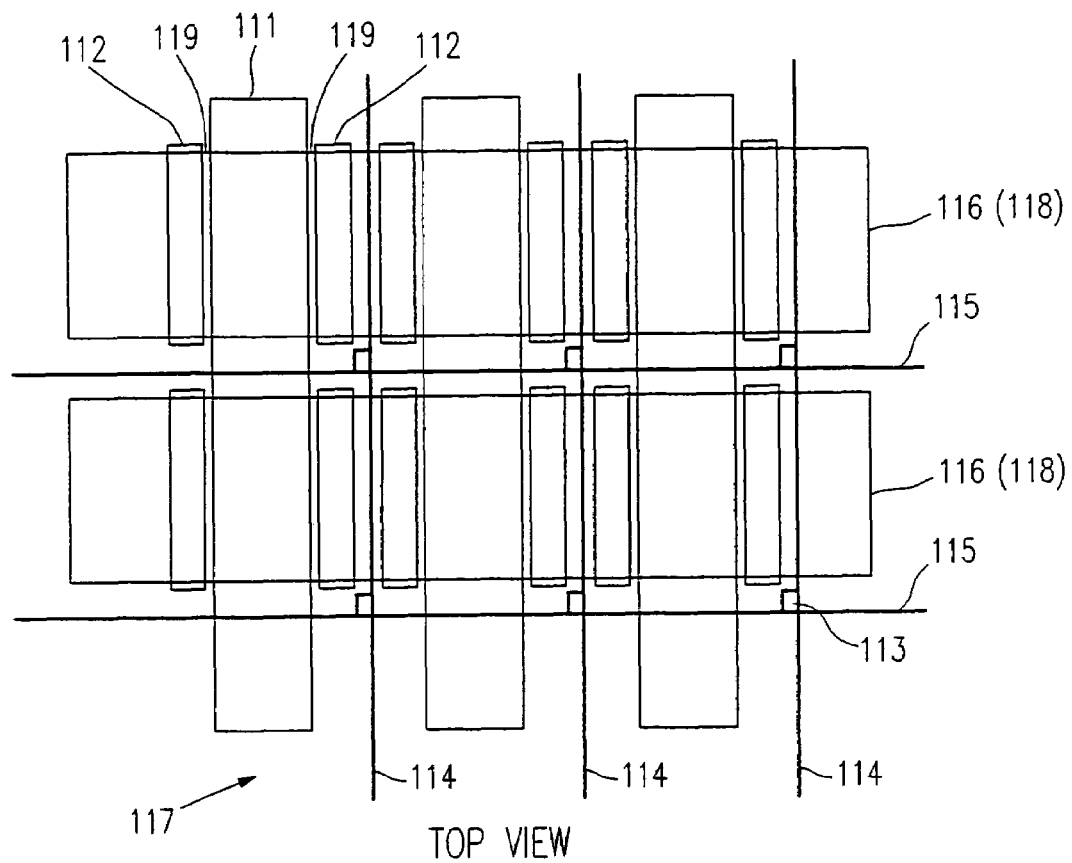
FIGS. 11A-11E illustrate the combination of the active and passive driving mechanisms.
Figure 11B:
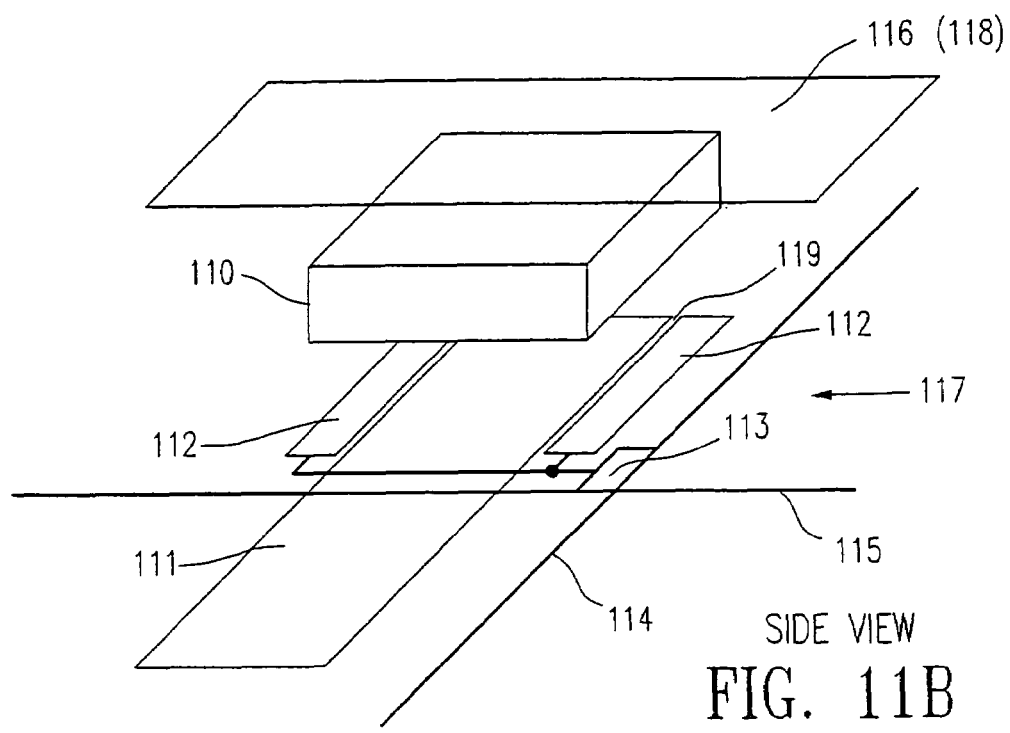
Figures 1, 11C:
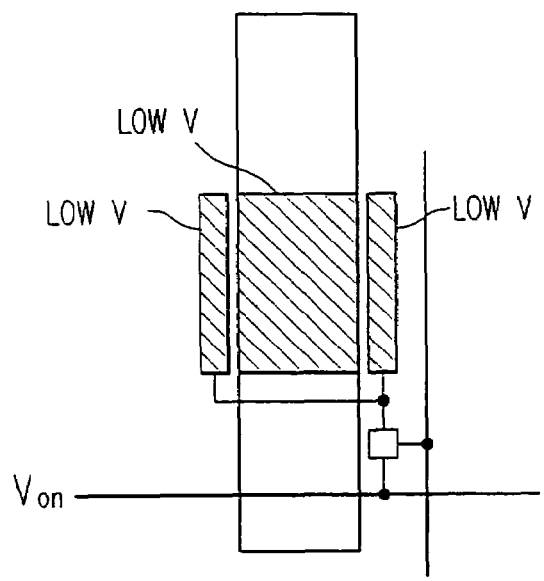
FIG. 1 illustrates the common deficiency of the traditional EPDs with only the up/down switching mode.

The EPD of FIG. 1 has only the up/down switching mode. The cells in the figure are filled with a suspension in which white positively charged particles are dispersed in a colored (red, green and blue) dielectric fluid. All three cells in FIG. 1 are shown charged with a voltage difference between the top and bottom electrodes (not shown). In the green and blue cells, the top electrode has a low voltage, the white positively charged particles in these two cells migrate to the top viewing electrode which is transparent, and as a result, the color of the particles (i.e., white) is reflected to the viewer through the transparent conductor film in the two cells. In the red cell, the bottom electrode has a low voltage; consequently the white positively charged particles migrate to the bottom of the cell, and the color of the medium (i.e., red) is seen through the top transparent conductor film. In the scenario as shown in FIG. 1, the white light reflected from the green and blue pixels greatly reduces the color saturation of the red pixel.

(2) EPD with only the In-plane Switching Mode

FIGS. 2A-2D illustrates the disadvantages of the prior art EPDs with only the in-plane switching mode.

Figures 2, 11C:
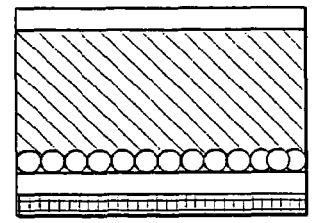

In FIG. 2A, the cells are filled with a colorless dielectric solvent with white charged particles dispersed therein. The background of the cells is colored (i.e., red, green or blue). When there is a voltage difference between the in-plane electrodes, the white particles migrate to either side of the cell, and the color of the background (i.e., red, green or blue) is seen from the top transparent opening. When there is no voltage difference between the in-plane electrodes, the particles are scattered in the dielectric solvent, resulting in white color (i.e., the color of the particles) being seen from the top transparent opening. This arrangement of colorless solvent, colored background and white particles results in a display lack of a high density black state.

In FIG. 2B, the cells are filled with a colorless fluid with black particles dispersed therein. The background of the cells is colored (i.e., red, green or blue). When there is a voltage difference between the in-plane electrodes, the particles migrate to either side of the cell, and the color of the background (i.e., red, green or blue) is seen from the top transparent opening. When there is no voltage difference between the in-plane electrodes, the particles are scattered in the dielectric solvent, resulting in a black color (i.e., the color of the particles) being seen from the top transparent opening. This arrangement of solvent/background/particle colors results in a dirty white state with undesirable Dmin and contrast ratio.

FIG. 2C shows the cells filled with a colorless fluid with colored particles (i.e., red, green or blue) dispersed therein. The background of the cells is black. When there is a voltage difference between the in-plane electrodes, the colored charged particles migrate to either side of the cell, and the color of the background (i.e., black) is seen from the top transparent opening. When there is no voltage difference between the in-plane electrodes, the colored particles are scattered in the dielectric solvent, resulting in the color of the particles (i.e., red, green or blue) being seen from the top transparent opening. In this design, the black state is of high quality. However, no high quality white state is possible. As a result, the reflective display of this type appears to have a dirty background or a low degree of reflection in the Dmin area.

In FIG. 2D, the cells are filled with a colorless fluid with colored particles (red, green or blue) dispersed therein. The background of the cells is white. When there is a voltage difference between the in-plane electrodes, the particles migrate to either side of the cell, and the color of the background (i.e., white) is seen from the top transparent opening, resulting in a high quality white state. When there is no voltage difference between the in-plane electrodes, the particles are scattered in the fluid, resulting in the color of the particles (i.e., red, green or blue) being seen from the top transparent opening. No high quality black state is available in this design.

In summary, the in-plane only switching mode results in either a reflective color display having no high quality black state or a display having no high quality white state. Contrast ratio and color saturation are poor in this type of in-plane switching, reflective color displays. In all in-plane switching EPDs, the substrate on the opposite side of the in-plane electrodes is typically a transparent insulator, which usually is the viewing side of the display.

II. Electrophoretic Display of the Present Invention

Figure 3:
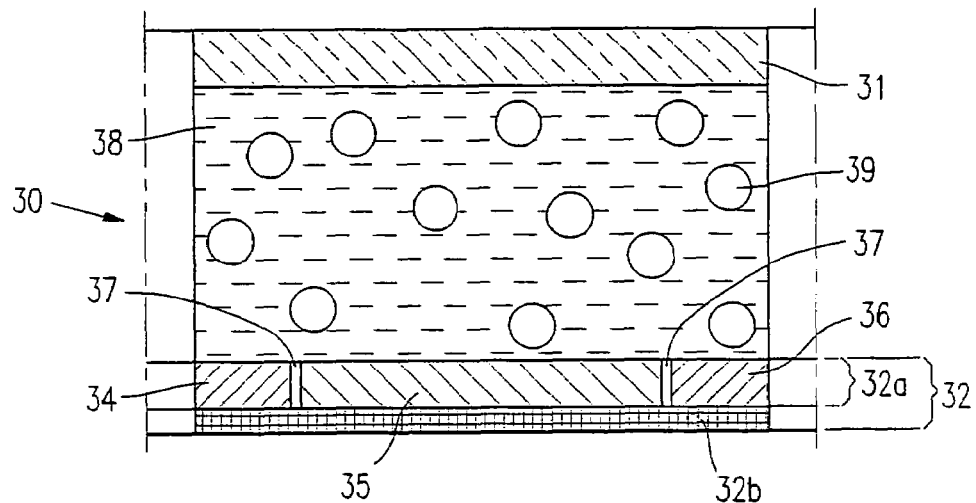
FIG. 3 illustrates a typical electrophoretic cell of the present invention and the general locations of the up/down and in-plane switching electrodes.

FIG. 3 illustrates a side view of a typical electrophoretic cell of the present invention. While only a cup-like cell is depicted, it is understood that the scope of the present invention encompasses cells formed from microchannels and the like, and all types of conventional electrophoretic cells.

The cell (30) is sandwiched between a top (31) and a bottom layer (32). The top layer contains a transparent top electrode (not shown). The bottom layer (32) has a layer (32a) comprising an in-plane switching electrode (34) on the left-hand side, a bottom electrode (35) and another in-plane electrode (36) on the right-hand side and optionally a colored background layer (32b). There is a gap (37) to separate the two in-plane electrodes (34, 36) from the bottom electrode (35).

The background layer (32b) may be on top of the electrode layer (32a) (not shown), or underneath the electrode layer (32a). Alternatively, the layer 32a may serve as the background layer and in this case, the layer 32a may be black or of other colors.

Another alternative is that the bottom layer may have only one in-plane switching electrode, and one bottom electrode with a gap in between.

Typically, the cells in FIG. 3 are filled with a clear, but colored (i.e., red, green or blue) dielectric solvent (38) with white particles (39) dispersed therein, and the background color of the cells is typically black. The particles may be positively or negatively charged. For the purpose of illustration, it is assumed that the particles are positively charged throughout this application.

The charged particles in the individual cells of a display may be of the same color or of different colors. The individual cells may also be filled with an electrophoretic fluid containing charged particles of mixed colors.

Figure 4A:
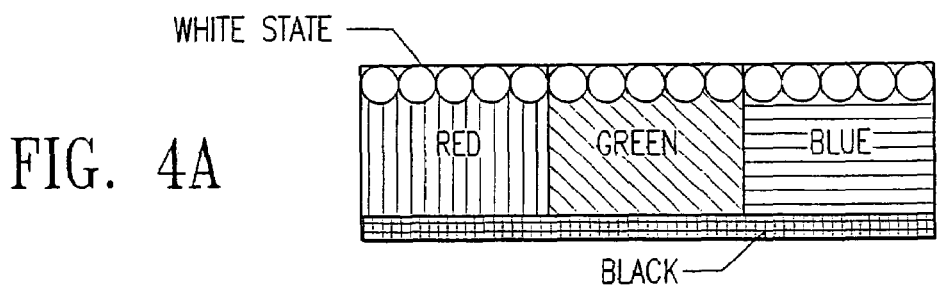
FIGS. 4A-4C illustrate the various possible scenarios of the improved EPD with dual modes.
Figure 4B:
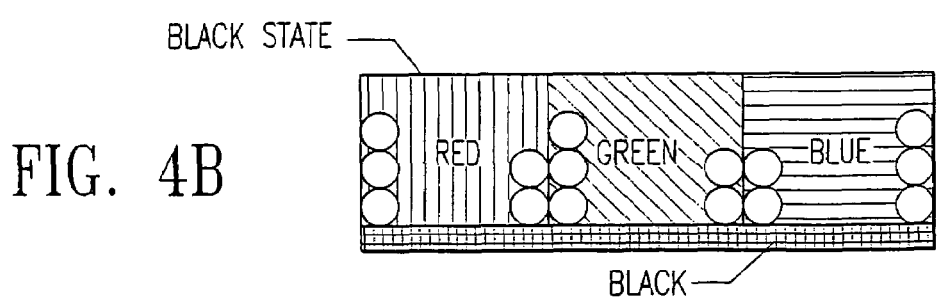
Figure 4C:
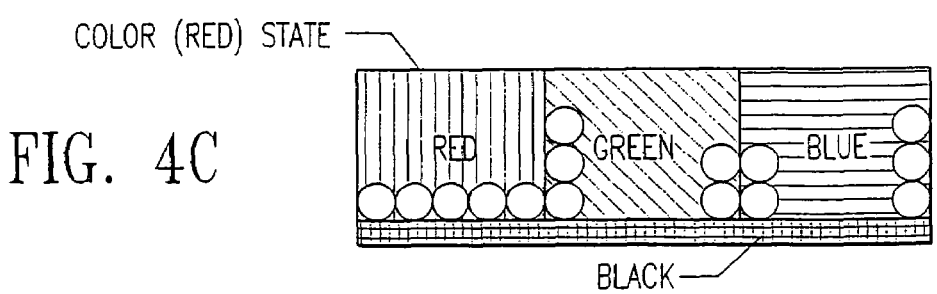

As shown in FIGS. 4A-4C, the dual switching mode allows the particles to move in either the vertical (up/down) direction or the planar (left/right) direction. For example, in FIG. 4A, the voltage of the top electrode is set low, and the voltages of the bottom electrode and the in-plane electrodes are set high. The white particles migrate to and gather at the top transparent conductor film, and the white color (i.e., the color of the particles) is seen by the viewer.

In FIG. 4B, the in-plane electrodes are set at low voltages, and the top and the bottom electrodes are set at high voltages. In this scenario, the white particles migrate to the sides of the cells, the color seen through the top transparent conductor film therefore is the color of the background (i.e., black).

In FIG. 4C, when the voltage of the top electrode is set high, the voltage of the bottom electrode is set low, and the in-plane electrodes are set at low voltage, the white particles migrate to the bottom of the cells. In this scenario, the color of the fluid (i.e., red, green or blue) is seen by the viewer through the top transparent conductor film as shown in the red cell of FIG. 4C. To present a red pixel in a full color display, the white particles in the green and blue cells may be either attracted to the sides as shown in FIG. 4C or to the top (not shown). The former is preferred because it typically exhibits a better color saturation than the latter. Thus the dual switching mode technology gives the first full-color EPD wherein all colors including red, green, blue, black and white of high quality are available in the same device.

Furthermore, the background color may be of any color (e.g., cyan, yellow or magenta) instead of the commonly used black color. For example, the cells of FIG. 3 may be filled with a red clear dielectric solvent with white positively charged particles dispersed therein and the background color of the cells may be yellow. In this case, when the particles migrate to the top, the white color (i.e., the color of the particles) is seen by the viewer and when the particles migrate to cover the bottom of the cells, the color of the medium (i.e., red) is seen through the transparent conductor. However, when the white particles migrate to the sides of the cells, the color seen through the top transparent conductor film, will be a shade of orange.

Other shades or color tones may be achieved by using different particle/medium/background color combinations, for example, white/red/cyan, white/red/magenta, white/blue/yellow, white/blue/cyan, white/blue/magenta, white/green/yellow, white/green/cyan, white/blue/magenta, etc.

The preferred combination to achieve a full color display is white particles, black background, and fluids separately colored with an additive primary color (i.e., red, green or blue).

Figure 4D:
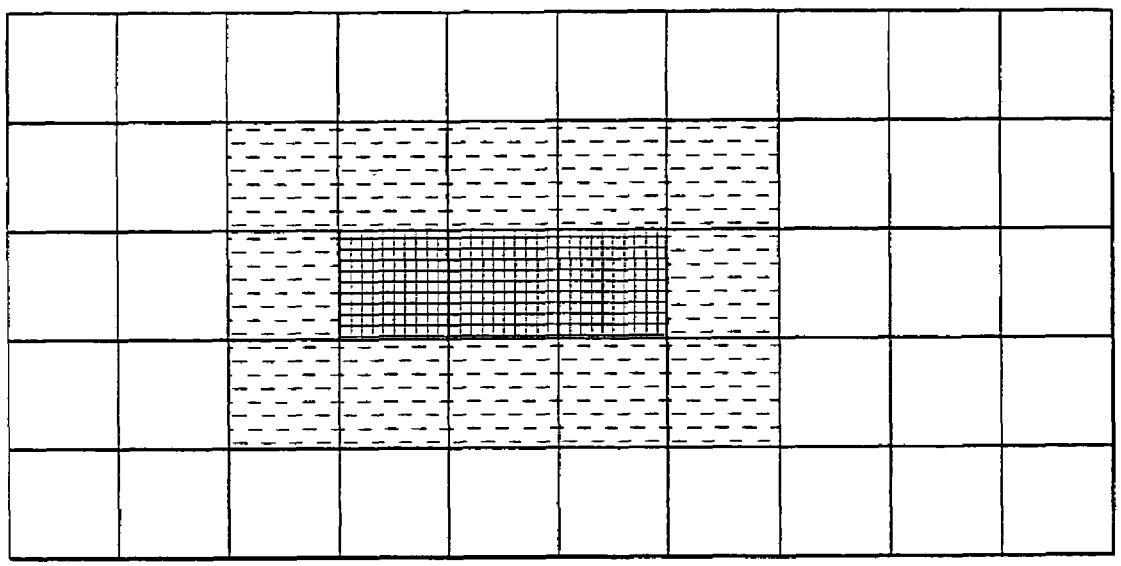
FIG. 4D illustrates the highlight option of the present invention (top view).
Figure 4D:
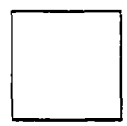
Figure 4D:
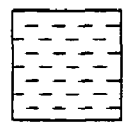
Figure 4D:
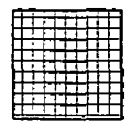

A further aspect of the invention is a monochrome display with highlight options. In such a case, all cells in the display have the same background color and are filled with the same electrophoretic fluid (i.e., having the same particle/solvent color combination). For example, the display may have white particles, the solvent is one of the primary colors (red, green or blue) and the background color is a color contrasting the solvent color. This arrangement is useful for a relatively simple two color device with a colored highlight option. For example, an EPD having white particles, a yellow dielectric solvent, and a black background can display at least three different colors in each cell or pixel as shown in FIG. 4D (top view). When the white particles are all attracted to the top viewing electrode, the white color is seen. When the white particles are uniformly attracted to the bottom electrodes, the yellow color is seen through the top viewing electrode. When the white particles are attracted to the in-plane electrode on either side of the cell, the black color is seen through the top viewing electrode. Intermediate colors are also possible if the particles are driven to intermediate states. This highly desirable feature of highlight capability in any pixels of the display can be realized by using the dual switching mechanism of this invention to drive a low cost monochrome EPD having preselected colors for the particles, the solvent and the background.

In summary, the EPDs of the present invention with the dual switching mode can provide the previously unattainable high quality full color EPDs and a monochrome EPD with highlight color capability in any pixels of a monochrome display.

III. Preparation of Electrophoretic Cells of the Present Invention

The microcups generally may be manufactured by microembossing or photolithography as disclosed in U.S. Ser. No. 09/518,488 filed Mar. 3, 2000 and U.S. Ser. No. 09/784,972 filed on Feb. 15, 2001.

While only the cup-like cells are illustrated in the figures, it is understood that conventional electrophoretic cells and electrophoretic cells prepared from microchannels, microcolumns and the like are also within the scope of the present invention.

III(a) Preparation of the Microcup Array by Microembossing Preparation of the Male Mold The male mold may be prepared by any appropriate method, such as a diamond turn process or a photoresist process followed by either etching or electroplating after the resist is developed. A master template for the male mold may be manufactured by any appropriate method, such as electroplating. With electroplating, a glass base is sputtered with a thin layer (typically 3000 Å) of a seed metal such as chrome inconel. It is then coated with a layer of photoresist and exposed to UV. A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. The master is then ready for electroforming. A typical material used for electroforming is nickel cobalt. Alternatively, the master can be made of nickel by electroforming or electroless nickel deposition as described in "Continuous manufacturing of thin cover sheet optical media", *SPIE Proc.* 1663:324 (1992). The floor of the mold is typically between about 50 to 400 microns thick. The master can also be made using other microengineering techniques including e-beam writing, dry etching, chemical etching, laser writing or laser interference as described in "Replication techniques for micro-optics", *SPIE Proc.* 3099:76-82 (1997). Alternatively, the mold can be made by diamond turning or photomachining using plastics, ceramics or metals.

The male mold thus prepared typically has protrusions between about 3 to 500 microns, preferably between about 5 to 100 microns, and most preferably about 10 to 50 microns, and can be of any shape like round, square, or of other geometry. The male mold may be in the form of a belt, a roller, or a sheet. For continuous manufacturing, the belt or the roller type of mold is preferred. Prior to applying a UV curable resin composition, the mold may be treated with a mold release to aid in the demolding process. To further improve the demolding process, the conductor film may be precoated with a primer or an adhesion promoting layer to improve the adhesion between the conductor and the microcups.

Microcups may be formed either in a batchwise process or in a continuous roll-to-roll process as described in U.S. Ser. No. 09/784,972 filed on Feb. 15, 2001, the content of which is incorporated herein by reference.

In the first step of the microembossing process, a UV curable resin is typically coated on a transparent patterned conductor film, by any appropriate means, such as roller coating, die coating, slot coating, slit coating, doctor blade coating, and the like. The conductor film is usually prepared by sputtering coating on a plastic substrate such as polyethylene terephthalate, polyethylene naphthate, polyaramid, polyimide, polycycloolefin, polysulfone and polycarbonate. The radiation curable material used is a thermoplastic or thermoset precursor, such as multifunctional acrylate or methacrylate, vinylether, epoxide and their oligomers, polymers and the like. Multifunctional acrylates and their oligomers are the most preferred. A combination of multifunctional epoxide and multifunctional acrylate is also very useful to achieve desirable physico-mechanical properties. The UV curable resin may be degassed prior to dispensing and may optionally contain a solvent. The solvent, if present, readily evaporates.

The radiation curable material coated on the conductor film/substrate is embossed by the male mold under pressure. If the male mold is metallic and opaque, the conductor film/substrate is typically transparent to the actinic radiation used to cure the resin. Conversely, the male mold can be transparent and the conductor film/substrate can be opaque to the actinic radiation.

After exposure to radiation, the radiation curable material becomes hardened. The male mold is then released from the microcups formed.

III(b) Preparation of Microcup Array by Photolithography

Figure 5A:
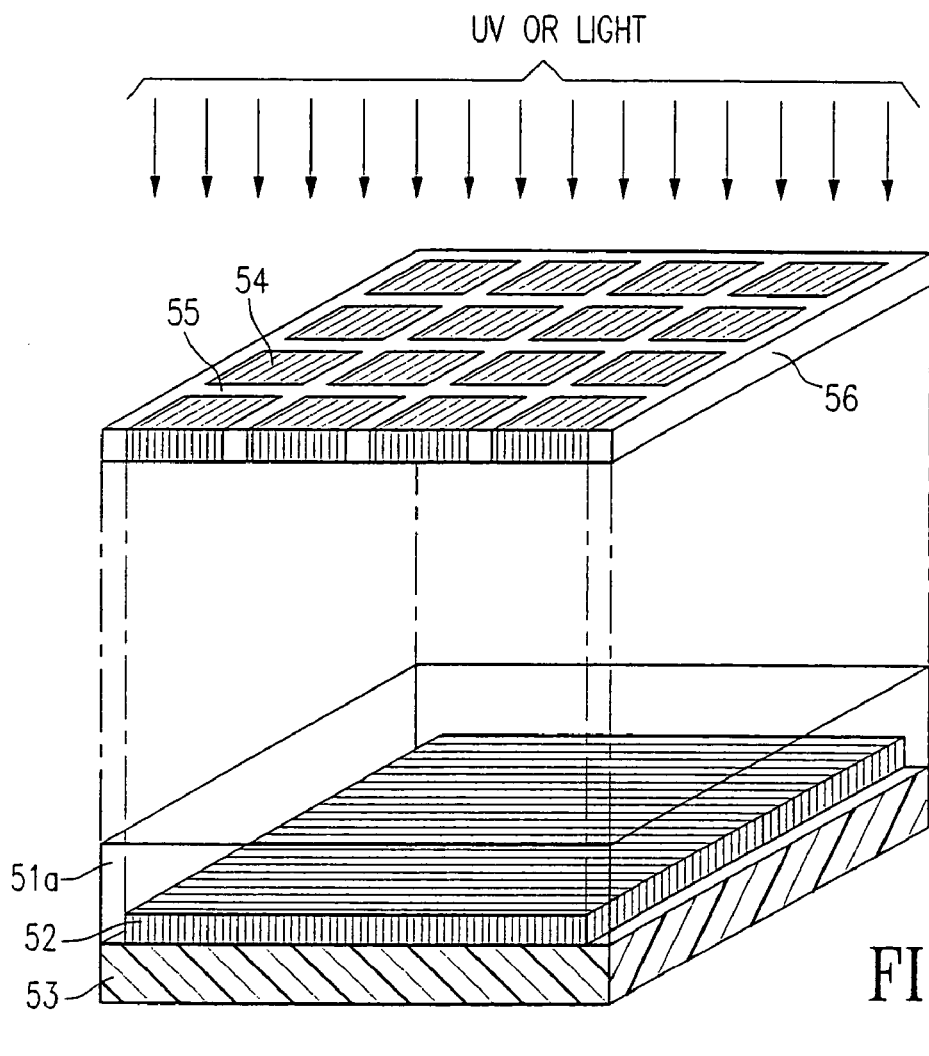
FIGS. 5A and 5B illustrate the manufacture of microcups involving imagewise photolithographic exposure through photomask.
Figure 5B:
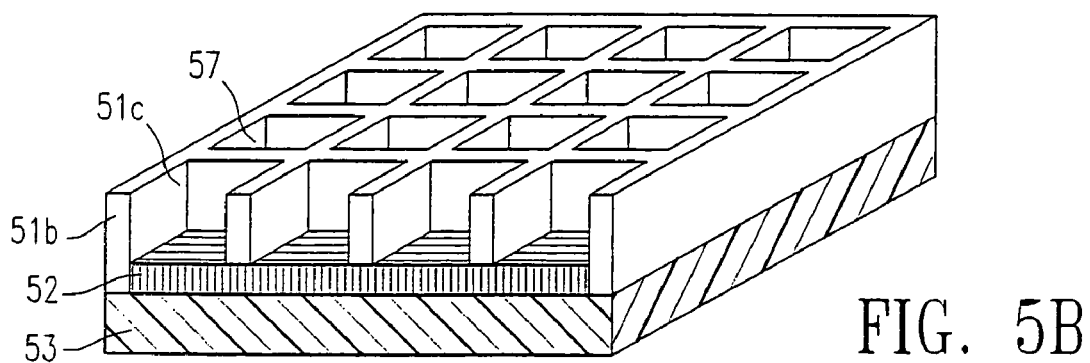

The photolithographic process for preparation of the microcup array is shown in FIGS. 5A and 5B.

As shown in FIGS. 5A and 5B, the microcup array may be prepared by exposure of a radiation curable material (51a), coated by any known methods onto a transparent patterned conductor film (52), to UV light (or alternatively other forms of radiation, electron beams and the like) through a mask (56) to form walls (51b) corresponding to the image projected through the mask (56). The conductor film (52) is on a plastic substrate (53).

In the photomask (56) in FIG. 5A, the dark squares (54) represent the area opaque to the radiation employed, and the space (55) between the dark squares represents the radiation-transparent area. The UV radiates through the opening area (55) onto the radiation curable material (51a).

As shown in FIG. 5B, the exposed areas (51b) become hardened and the unexposed areas (protected by the opaque area (54) of the mask (56)) are then removed by an appropriate solvent or developer to form the microcups (57). The solvent or developer is selected from those commonly used for dissolving or dispersing radiation curable materials such as methylethylketone, toluene, acetone, isopropanol or the like.

Alternatively, the exposure can be done by placing the photomask underneath the conductor film/substrate. In this case, the conductor film/substrate must be transparent to the radiation wavelength used for exposure.

III(c) Opaque Partition Walls

Figure 13A:
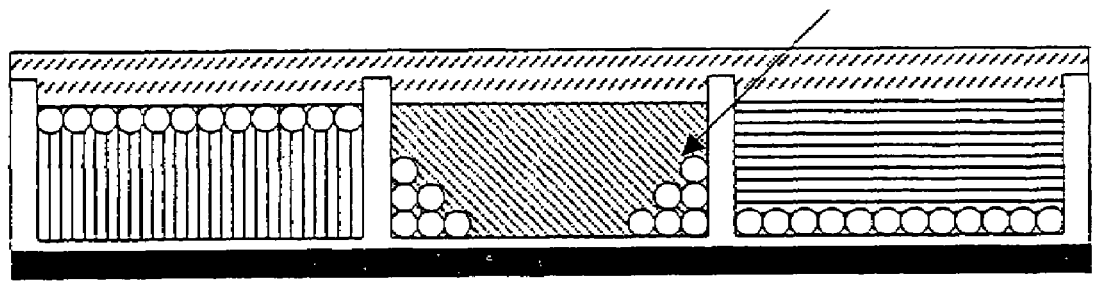
FIGS. 13A and 13B illustrate microcups having transparent and opaque partition walls, respectively.
Figure 13B:
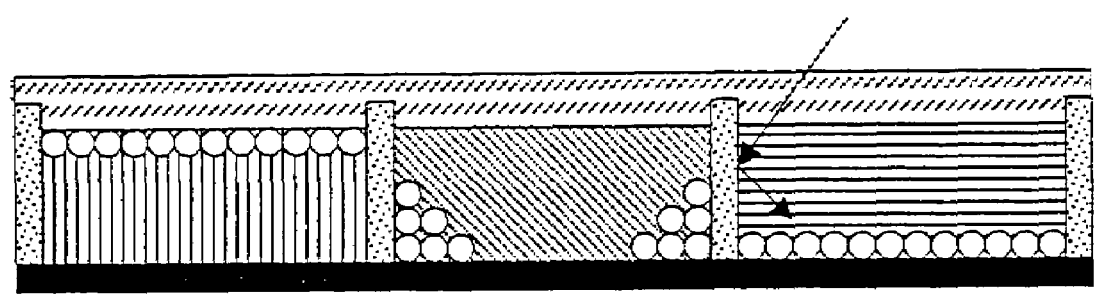

In one embodiment, the partition walls of the microcups are preferably opaque (such as white opaque or gray opaque). FIGS. 13A and 13B are simplified cross-section views of the microcups having transparent or opaque partition walls, respectively. FIG. 13A shows that the electrophoretic composition in one microcup may be seen from the top of a neighboring microcup through the transparent partition wall dividing the two microcups. In such a case, more than one color may be perceived by the viewer which results in a color shift or parallax (double image). This phenomenon may be avoided if the partition wall is opaque as shown in FIG. 13B. The opaque partition walls may be achieved by adding a filler material such as silica, ZnO, $TiO_2$, $BaSO_4$, $CaCO_3$ or polymer particles, preferably silica or polymer particles in the amount of 1-20% by weight, preferably in the amount of 2-10% by weight, into the radiation curable material for the formation of the microcups as described above.

The partition walls may also be colored by a dye or pigment in the radiation curable material for the formation of the microcups. The filler, dye or pigment used in the radiation curable composition should not interfere with the polymerization or crosslinking of the composition during the microcup forming process. The maximum concentration of the filler, dye or pigment in the radiation curable microcup formulation is dependent on the optical density of the composition and the type of radiation used to cure the composition. To facilitate the microcup formation and mold release, the resultant radiation curable composition must allow enough light or radiation to reach the bottom of the microcups to assure proper physicomechanical properties of the microcups and their adhesion to the substrate underneath.

A latent light scattering material may be used to produce the opaque partition walls. Light scattering centers such as air pockets or dispersed polymer phase may be produced from the latent material during or after the microcup forming step(s). For example, a filler material that is marginally compatible with the radiation curable composition but incompatible with the cured microcups may be added in the radiation curable composition. Upon exposure to radiation, the filler material phase-separates and forms discrete light-scattering domains in the cured microcup structure. Similarly, air pockets may be formed during or after the microcup forming step(s) by incorporating, into the radiation curable microcup composition, a thermally or photochemically triggered gas-releasing material as described in G. J. Sabongi, "Chemical Triggering, Reactions of Potentially Utility in Industrial Processes", Plenum Press, (1987). Examples of the gas releasing reactions may include $CO_2$ from carboxylic acids, bicyclic lactones or heterocycles; CO from ketones or bicyclic adducts; SO and $SO_2$ from sulfones, sulfonyloxy compounds or heterocycles, particularly 3-membered and 5-membered heterocycles; $N_2$ from azoalkanes, azides, diazomethanes, N-nitroso compounds, diazo, triazo or tetraazo heterocycles; COS from xanthates; or $O_2$ from endoperoxides. Air pockets may also be formed by an ultrasonic-wave triggered gas release reaction of phenol, tropolone, pyridine, pyrazine, pyrrole or halogenated derivatives thereof.

Figure 13C:
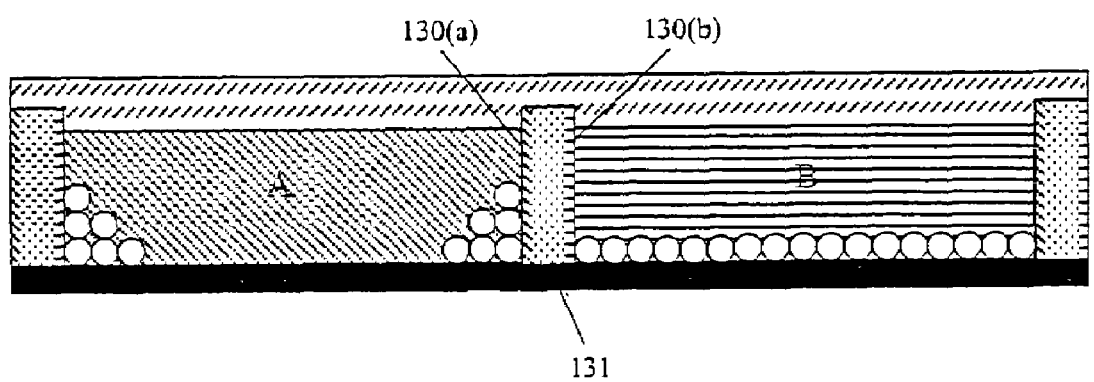
FIG. 13C illustrates the two sides of a partition wall having different colors.

In one embodiment, the inside surface (130) of the partition walls (131) may be colored to match the color of the dielectric solvent in the electrophoretic composition as shown in FIG. 13C. In this scenario, it is possible that the two sides of a partition wall may have two different colors if the two adjacent electrophoretic cells are of different colors. For example, if cell A in FIG. 13C is filled with a red electrophoretic composition whereas the adjacent cell B is filled with a green electrophoretic composition, one side (130a) of the partition wall facing the red cell may be of the red color and the other side (130b) facing the green cell may be of the green color. The different sides of partition walls may be colored sequentially by, for example, impregnating selective microcups in a dye or pigment solution/dispersion before the selective filling/sealing steps of forming a color display according the process disclosed in copending U.S. patent application Ser. No. 09/879,408, filed on Jun. 11, 2001, the content of which is incorporated herein by reference.

The openings of the microcups prepared according to the methods described above may be round, square, rectangular, hexagonal, or any other shape. The partition area between the openings is preferably kept small in order to achieve high color saturation and contrast ratio while maintaining desirable mechanical properties. Consequently, the honeycomb-shaped opening is preferred over, for example, the circular opening.

For reflective electrophoretic displays, the dimension of each individual microcup may be in the range of about $10^2$ to about $1 \times 10^6$ $\mu m^2$, preferably from about $10^3$ to about $1 \times 10^5$ $\mu m^2$. The depth of the microcups is in the range of about 5 to about 200 microns, preferably from about 10 to about 100 microns. The opening to the total area ratio, total area being defined as that of one cup including walls measured from wall centers, is in the range of from about 0.05 to about 0.95, preferably from about 0.4 to about 0.9.

The colored background layer of the cells may be added by painting, printing, coating, vapor deposition, sputtering or laminating a colored layer onto the bottom layer (the non-viewing side).

III(d) Preparation of the Suspensions

The cells are filled with an electrophoretic composition comprising charged pigment particles dispersed in a colored dielectric solvent. The electrophoretic composition may optionally contain additional colorants that do not migrate in the electric field. The pigment dispersion may be prepared according to methods well known in the art, such as U.S. Pat. Nos. 6,017,584, 5,914,806, 5,573,711, 5,403,518, 5,380,362, 4,680,103, 4,285,801, 4,093,534, 4,071,430, and 3,668,106.

See also *IEEE Trans. Electron Devices*, ED-24, 827 (1977), and *J. Appl. Phys.* 49(9):4820 (1978).

The dielectric solvent preferably has a low viscosity and a dielectric constant in the range of about 2 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as, dichlorobenzotrifluoride, 3,4,5-trichlorobenzotrifluoride, chloropentafluoro-benzene, dichlorononane, pentachlorobenzene, and perfluorinated solvents such as perfluorodecalin, perfluorotoluene, perfluoroxylene, FC-43, FC-70 and FC-5060 from 3M Company, St. Paul Minn. low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylethers such as Galden, HT-200, and Fluorolink from Ausimont or Krytox Oils and Greases K-Fluid Series from DuPont, Del. In one preferred embodiment, poly(chlorotrifluoroethylene) is used as the dielectric solvent. In another preferred embodiment, poly(perfluoropropylene oxide) is used as the dielectric solvent.

The dielectric solvent may be colored by a contrasting dye or pigment. Nonionic azo and anthraquinone dyes are particularly useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthraquinone blue, anthraquinone yellow 114, anthraquinone reds 111 and 135, anthraquinone green 28 from Aldrich. Fluorinated dyes are particularly useful when perfluorinated solvents are used. In case of a contrasting pigment, the colorant of the medium may also be dispersed in the dielectric medium and are preferably uncharged. If the contrasting color pigment particles are charged, they preferably carry a charge which is opposite from that of the charged primary color pigment particles. If both the contrasting color and the primary color pigment particles carry the same charge, they should have different charge density or different electrophoretic mobility. The dyes or pigments used in EPDs must be chemically stable and compatible with other components in the suspension.

The charged primary color particles are preferably white, and may be organic or inorganic pigments, such as $TiO_2$, $BaSO_4$ or ZnO.

If colored pigment particles are used, they may be selected from phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher. Particle size is preferably in the range of 0.01-5 microns, and is even more preferably in the range of 0.05-2 microns. The particles should have acceptable optical characteristics, should not be swollen or softened by the dielectric solvent, and should be chemically stable. The resulting suspension must also be stable against sedimentation, creaming or flocculation under normal operating conditions.

The migrating pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, metal soaps, polybutene succinimide, maleic anhydride copolymers, vinylpyridine copolymers, vinylpyrrolidone copolymer (such as Ganex from International Specialty Products), (meth)acrylic acid copolymers, and N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from DuPont.

Suitable charged pigment dispersions may be manufactured by any of the well-known methods including grinding, milling, attriting, microfluidizing, and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the dielectric solvent may be added to the suspension during the ball milling process.

Sedimentation or creaming of the pigment particles may be eliminated by microencapsulating the particles with suitable polymers to match the specific gravity to that of the dielectric solvent. Microencapsulation or coating of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

Density matched pigment-containing microparticles may be prepared according to methods disclosed in copending U.S. patent applications, U.S. Ser. No. 60/345,936, filed on Jan. 3, 2002, U.S. Ser. No. 60/345,934 also filed on Jan. 3, 2002, U.S. Ser. No. 10/335,210 filed on Dec. 31, 2002, U.S. Ser. No. 10/335,051 filed on Dec. 31, 2002, U.S. Ser. No. 60/400,021 filed on Jul. 30, 2002, U.S. Ser. No. 60/418,078 filed on Oct. 10, 2002 and U.S. Ser. No. 60/356,226 filed on Feb. 11, 2002, the contents of which are incorporated herein by reference in their entirety. The average particle size of the density-matched pigment-containing microparticles may be in the range of 0.1-10 µm, preferably in the range of 0.25-3 µm.

III(e) Filling and Sealing of the Microcups

The filling and sealing procedures are described in the co-pending applications, U.S. Ser. No. 09/518,488, U.S. Ser. No. 09/784,972, U.S. Ser. No. 09/879,408, U.S. Ser. No. 09/874,391 and U.S. Ser. No. 60/408,256, the disclosures of which are incorporated herein by reference in their entirety.

After the microcups are filled with an electrophoretic composition, they are top-sealed. The critical step of top-sealing of the microcups may be accomplished in a number of ways. A preferred approach is to disperse a UV curable composition into an electrophoretic fluid comprising charged pigment or pigment-containing particles dispersed in a colored dielectric solvent. The suitable UV curable materials may include acrylates, methacrylates, styrene, alpha-methylstyrene, butadiene, isoprene, allylacrylate, polyvalent acrylate or methacrylate, cyanoacrylates, polyvalent vinyl including vinylbenzene, vinylsilane, vinylether, polyvalent epoxide, polyvalent isocyanate, polyvalent allyl, and oligomers or polymers containing crosslinkable functional groups. The UV curable composition is immiscible with the dielectric solvent and has a specific gravity lower than that of the electrophoretic composition comprising pigment particles dispersed in a dielectric solvent. The two compositions, UV curable composition and the electrophoretic composition, are thoroughly blended with, for example, an in-line mixer, and immediately coated onto the microcups with a precision coating mechanism such as Myrad bar, gravure, doctor blade, slot coating or slit coating. Excess fluid is removed by a wiper blade or a similar device. A small amount of a weak solvent or solvent mixture such as heptane, isopropanol and methanol may be used to clean the residual electrophoretic fluid on the top surface of the partition walls of the microcups. Volatile organic solvents may be used to control the viscosity and coverage of the electrophoretic fluid. The thus-filled microcups are then dried and the UV curable composition floats to the top of the electrophoretic fluid. The microcups may be top-sealed by curing the supernatant UV curable layer during or after it floats to the top. The UV light or other forms of radiation such as visible light, IR or electron beam may be used to cure the top-sealing layer and seal the microcups. Alternatively, heat or moisture may also be employed to cure the top-sealing layer and seal the microcups, if a heat or moisture curable composition is used.

A preferred group of dielectric solvents exhibiting desirable density and solubility discrimination against acrylate monomers and oligomers are halogenated hydrocarbons, particularly perfluoro solvents such as perfluoroethers from Ausimont, Italy or Du Pont, Del., and their derivatives. Surfactants may be used to improve the adhesion and wetting at the interface between the electrophoretic fluid and the sealing materials. Surfactants include the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives.

Alternatively, the electrophoretic fluid and the top-sealing composition may be applied sequentially onto the microcups to prevent intermixing, particularly when the sealing precursor is at least partially compatible with the dielectric solvent. Thus, the top-sealing of the microcups may be accomplished by overcoating a thin layer of a top-sealing composition which is hardenable by radiation, heat, solvent evaporation, moisture or interfacial reactions on the surface of the filled microcups. Volatile organic solvents may be used to adjust the viscosity and the thickness of the coatings. When a volatile solvent is used in the overcoat, it is preferred that it is immiscible with the dielectric solvent to reduce the degree of intermixing between the top-sealing layer and the electrophoretic fluid. To further reduce the degree of intermixing, it is highly desirable that the specific gravity of the overcoated top-sealing composition is no greater than that of the electrophoretic fluid. In the co-pending patent application, U.S. Ser. No. 09/874,391, filed Jun. 4, 2001, compositions comprising a thermoplastic elastomer have been disclosed as the preferred top-sealing composition. In copending patent application U.S. Ser. No. 60/408,256, the content of which is incorporated herein by reference, compositions comprising a polyurethane have been disclosed as the preferred top-sealing composition. Additives such as silica particles, binder polymers or surfactants may be used to improve the film integrity and coating quality.

Alternatively, interfacial polymerization followed by UV curing has been found beneficial to the top-sealing process. Intermixing between the electrophoretic layer and the top-sealing overcoat is significantly suppressed by the formation of a thin barrier layer at the interface by interfacial polymerization or crosslinking. The top-sealing is then completed by a post curing step, preferably by UV radiation. The two-step overcoating process is particularly useful when the dye used is at least partially soluble in the top-sealing composition.

III(f) Lamination of the Microcups

The top-sealed microcups are then laminated with the other electrode film preferably with an adhesive layer. Suitable adhesive materials include acrylic and rubber types of pressure sensitive adhesives, UV curable adhesives containing for example, multifunctional acrylates, epoxides, vinylethers or thiol-ene, and moisture or heat curable adhesives such as epoxy, polyurethane, and cyanoacrylate.

In one embodiment of the invention, a substrate containing thin film transistors may be used as one of the bottom layer electrodes to also provide the active driving mechanism and the top electrode, in this scenario, is transparent.

The second (top) electrode layer may also be disposed on the top-sealed microcups by coating, printing, vapor deposition, sputtering or a combination thereof.

The top electrode layer may also be coated or laminated with a top substrate layer.

Figure 14A:
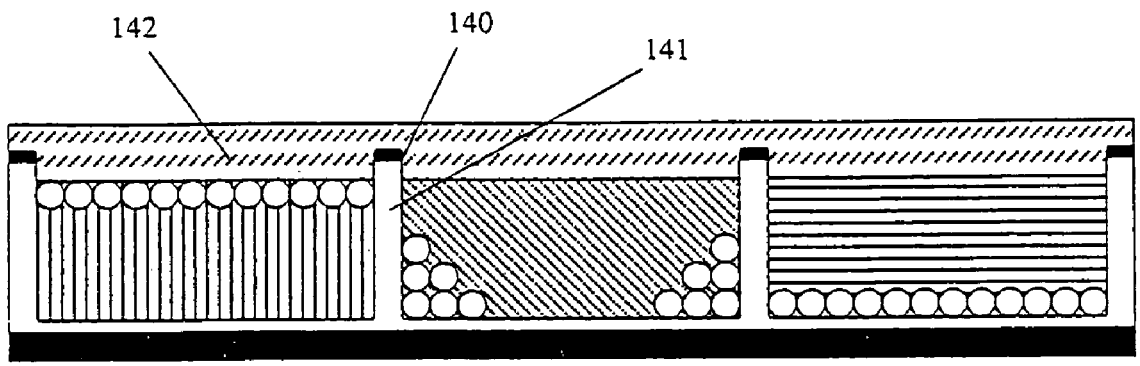
FIGS. 14A-14H illustrate the cross-section views of various black matrix layer locations.
Figure 14B:
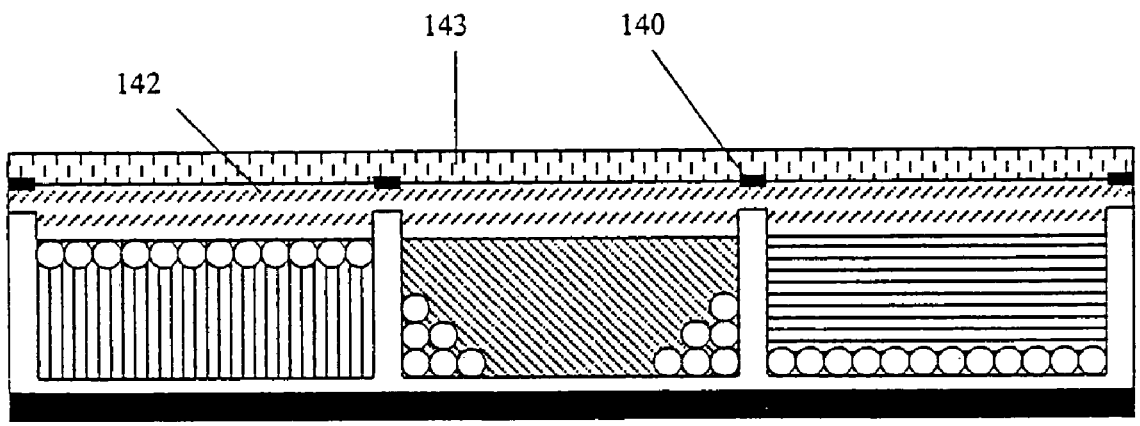
Figure 14C:
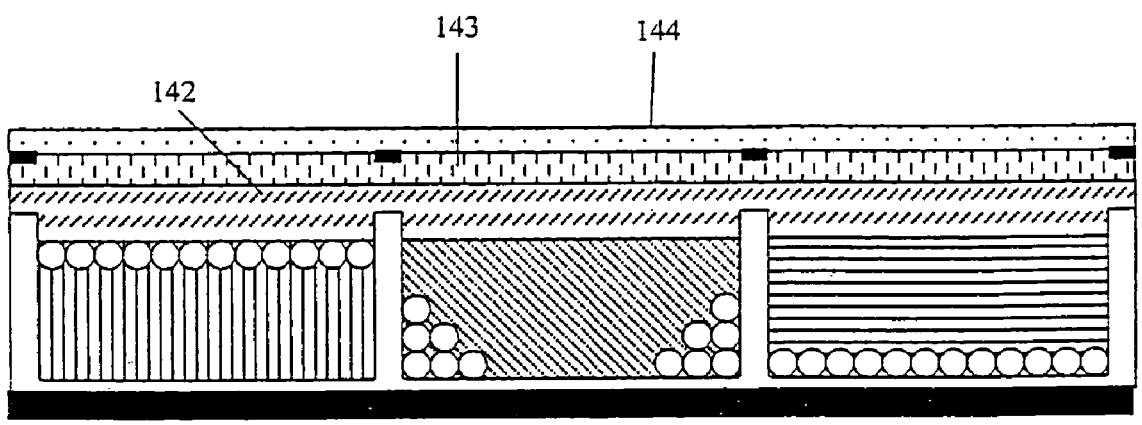
Figure 14D:
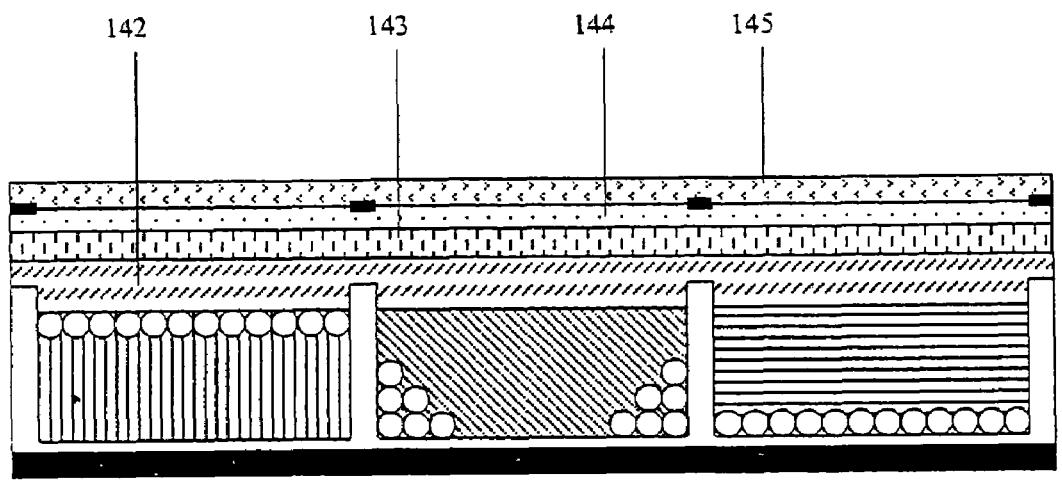
Figure 14E:
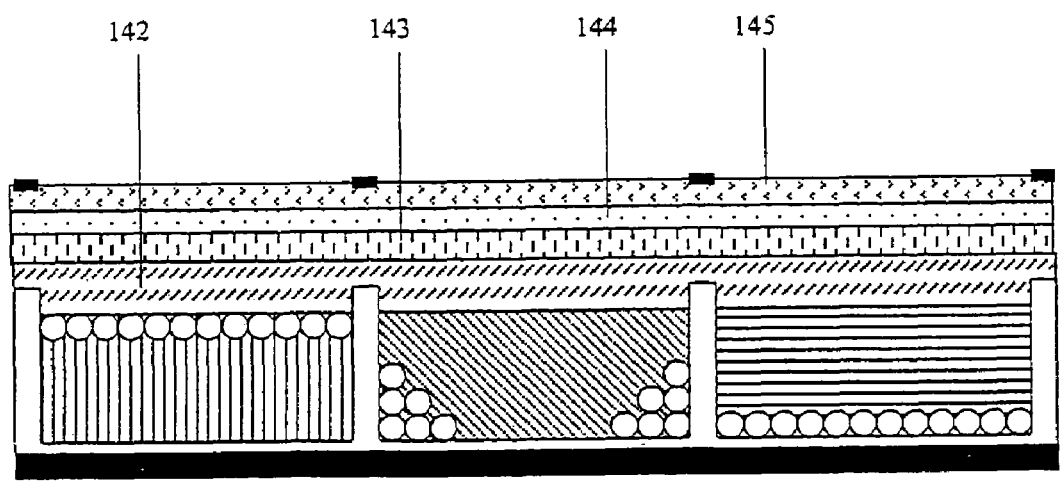
Figure 14F:
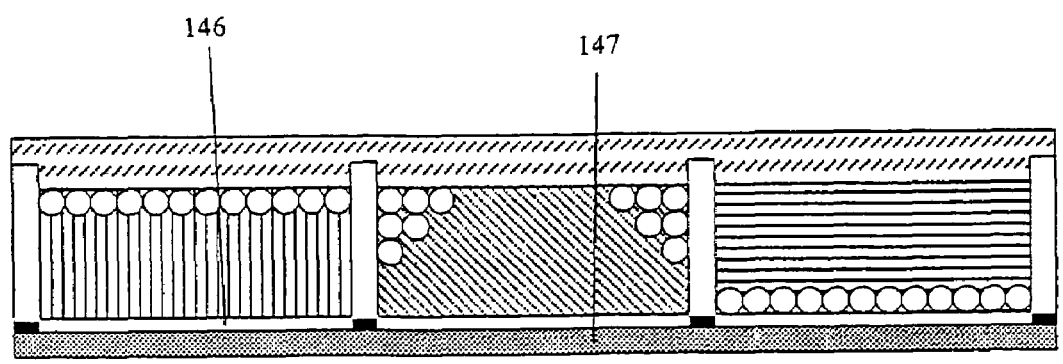
Figure 14G:
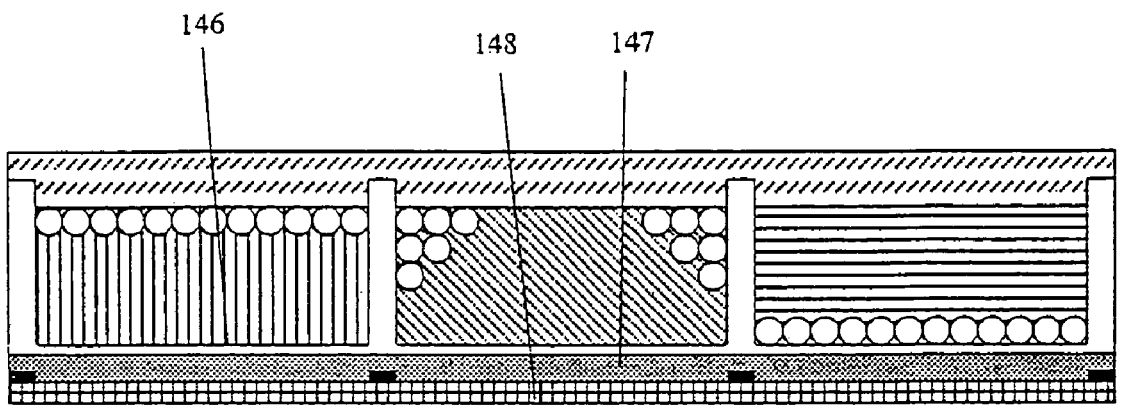
Figure 14H:
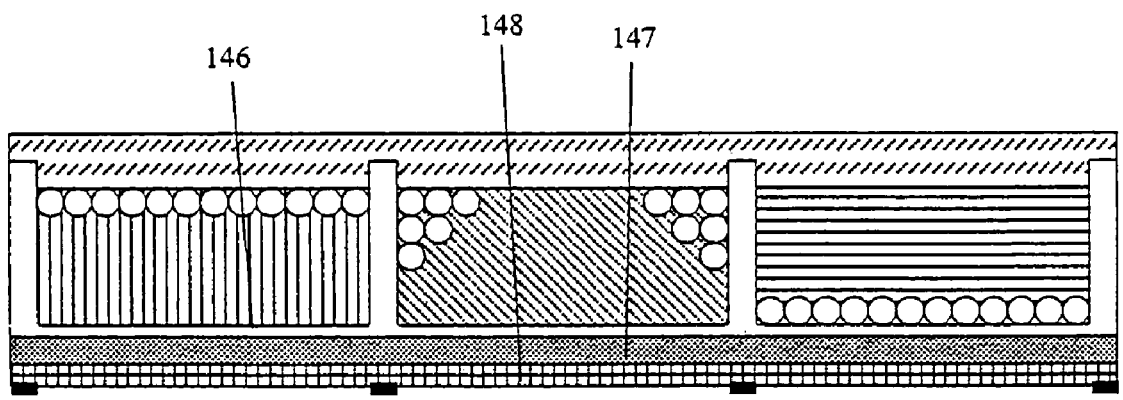

III(g) Application of a Black Matrix Layer over the Top Surface of the Partition Walls When the viewing side is from the top-sealing side of the microcups, the black matrix may be applied between the top surface (140) of the partition walls (141) and the top-sealing layer (142) as shown in FIG. 14A, between the top-sealing layer (142) and the adhesive layer (143), if present, as shown in FIG. 14B, between the adhesive layer (143), if present, and the top electrode layer (144) as shown in FIG. 14C, between the top electrode layer (144) and the top substrate (145) as shown in FIG. 14D or on top of the top substrate (145) as shown in FIG. 14E. When the viewing side is from the bottom, the black matrix may be applied between the microcups (146) and the bottom electrode layer (147) as shown in FIG. 14F, between the bottom electrode layer (147) and the bottom substrate (148) as shown in FIG. 14G or on the bottom surface of the bottom substrate (148) as shown in FIG. 14H.

A black matrix layer may be applied with registration to the partition walls. In other words, the black matrix layer is on the top surface of the partition walls or on another layer in areas corresponding to the top surface of the partition walls. The openings of the microcups or areas corresponding to the openings of the microcups are not covered by the black matrix layer. The black matrix layer may be applied by a method such as printing, stamping, photolithography, vapor deposition or sputtering with a shadow mask. The optical density of the black matrix may be higher than 0.5, preferably higher than 1. Depending on the material of the black matrix and the process used to dispose the black matrix, the thickness of the black matrix may vary from 0.005 μm to 5 μm, preferably from 0.01 μm to 2 μm.

In one embodiment as shown in FIG. 14A, a thin layer of black coating or ink may be transferred onto the top surface (140) of the partition walls (141) after formation of the microcups, by an offset rubber roller or stamp. After the transferred coating or ink is hardened, the microcups are subsequently filled and top-sealed (142). In this case, the hardened black matrix must be resistant to the solvent(s) used in both the electrophoretic and top-sealing compositions.

In another embodiment as shown in FIG. 14B, the black matrix layer may be applied, with registration to the partition walls, onto the top-sealing layer after the microcups are filled and top-sealed. For example, a photosensitive black coating may be coated onto the top-sealing layer (142) and exposed imagewise with registration through a photomask. The photosensitive black coating may be a positively-working or negatively-working resist. When a positively-working resist is used, the photomask should have openings corresponding to the microcup areas. In this scenario, the photosensitive black coating in the microcup areas (exposed) is removed by a developer after exposure. If a negatively-working resist is used, the photomask should have openings corresponding to the top surface of the partition walls. In this scenario, the photosensitive black coating in the microcup areas (unexposed) is removed by a developer after exposure. The solvent(s) used to apply the black coating and the developer(s) for removing the coating should be carefully selected so that they do not attack the top-sealing layer.

Alternatively, a colorless photosensitive ink-receptive layer may be applied onto the top sealing layer followed by exposure through a photomask. If a positively-working photosensitive latent ink-receptive layer is used, the photomask should have openings corresponding to the top surface of the partition walls. In this scenario, after exposure, the exposed areas become ink-receptive or tacky and a black matrix may be formed on the exposed areas (the top surface of the partition walls) after a black ink or toner is applied onto those areas. Alternatively, a negatively-working photosensitive ink-receptive layer may be used. In this case, the photomask should have openings corresponding to the microcups and after exposure, the exposed areas (the microcup areas) are hardened while a black matrix layer may be formed on the unexposed areas (the top surface of the partition walls) after a black ink or toner is applied onto those areas. The black matrix may be post cured by heat or flood exposure to improve the film integrity and physicomechanical properties.

In another embodiment, the black matrix may be applied by printing such as screen printing or offset printing, particularly waterless offset printing.

In still another embodiment, the black matrix may be applied onto the adhesive layer, if present, electrode layer or the substrate layer with registration to the top surface of the partition walls by any of the methods mentioned above.

To complete the display assembly, a diffuser layer may be applied directly or indirectly above the black matrix layer to improve the visual effect of the finished display device.

Figure 14I:
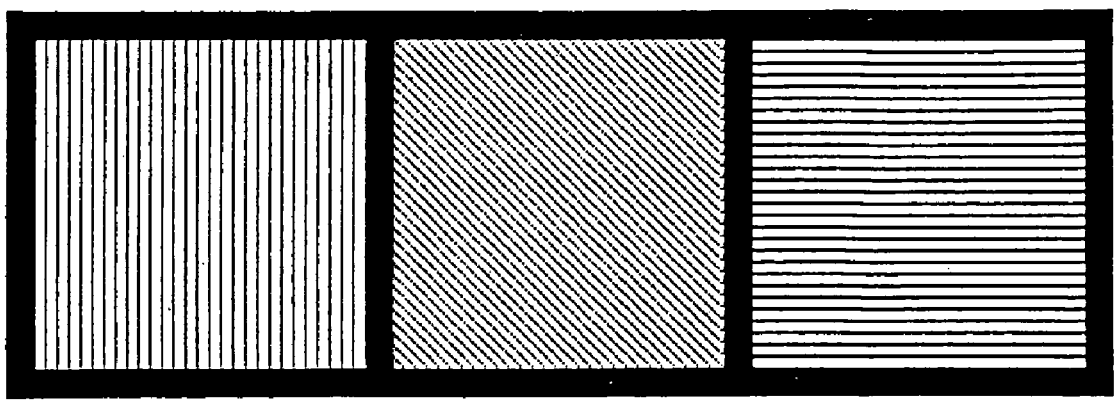
FIG. 14I illustrates the top view of microcups having partition walls with a black matrix layer.

FIG. 14I is the top view of microcups having partition walls with a black matrix top surface. As shown, the areas over the openings of the microcups remain transparent. While microcups of a square opening are shown in FIG. 14I, the top opening shape of the microcups may vary. It may be rectangular, circular or a more complex shape if desired.

The black matrix layer added to the top surface of the color display significantly improves the contrast ratio and color saturation of the display. In the case when a highly crosslinked black matrix layer is formed on the top surface of the display from, for example, the above-mentioned photosensitive ink-receptive layer, it may also render the top surface more resistant to scratch and finger prints.

While not specifically described, it is understood that the combination of the black matrix layer as described in this section and the opaque or colored partition walls as described above in Section 111(c) above is also beneficial.

Figure 6A:
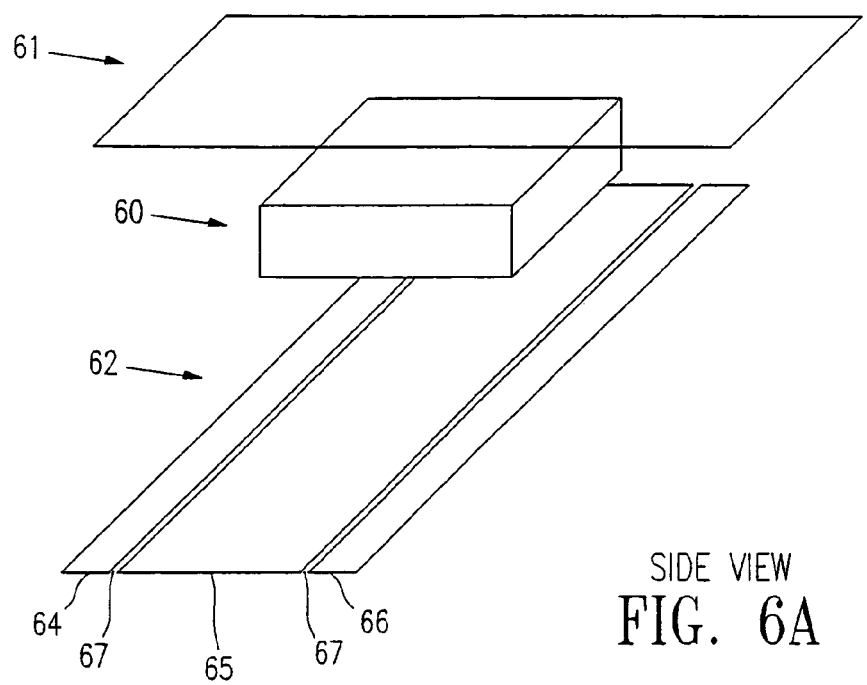
FIGS. 6A and 6B illustrate the two-layered ITO electrode system.
Figure 6B:
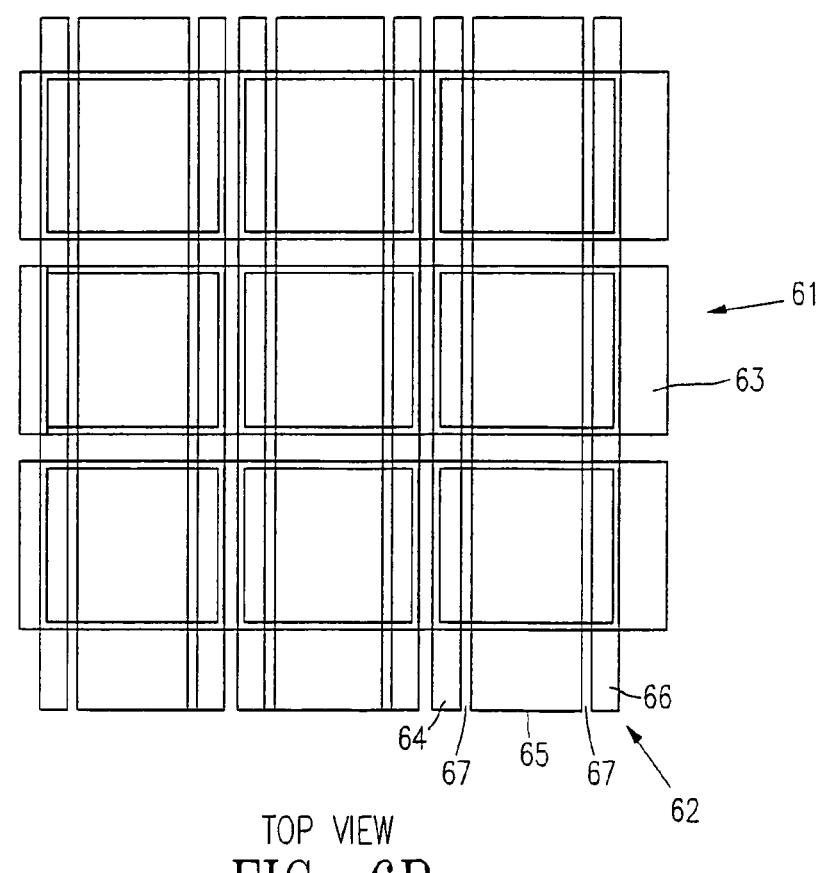

IV. The Operations of the Dual Mode Switching
  IV(a) Passive Matrix
  (1) Electrode Circuit Design FIG. 6A is the side view of the two-layer passive matrix electrode circuit design. FIG. 6B shows the top view of a two-layer passive matrix electrode design for dual-mode. The cells (60) are sandwiched between one top layer (61) and a bottom layer (62). The horizontal bars are the row electrodes (63) that are transparent and run through the top of the cells. The bottom layer (62) consists of one in-plane electrode (64) that is on the left-hand side of the cell, one bottom column electrode (65) and another in-plane electrode (66) on the right-hand side. There are gaps (67) between the in-plane electrodes and between the in-plane electrodes and the column electrodes.

The cross section of the top row electrode, the bottom column electrode, and the in-plane electrodes define the display cell.

(2) Driving Timing Sequences

To illustrate the dual mode switching of this invention, electrophoretic cells comprising a common black background and positively charged white particles dispersed in a clear colored solvent are used.

A true white state may be generated by applying the top row electrodes (63) of selected cells or pixels with a lower voltage and at the same time applying the bottom column electrodes (65) and the in-plane electrodes (64) with a higher voltage. At this bias setting, the particles are driven to the top row electrodes, and the white color is seen through the top transparent conductor layer by the viewer.

Figure 7A:
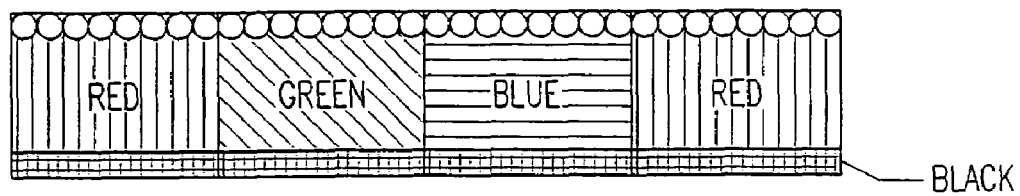
FIGS. 7A and 7B illustrate the true white state of the present invention, the top and cross-section views.
Figure 7B:
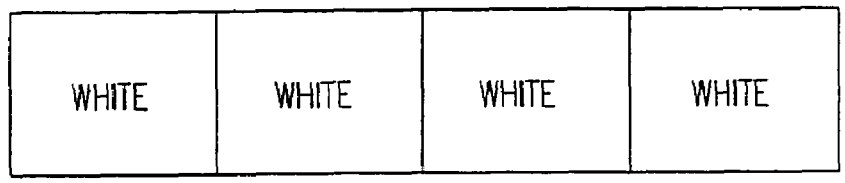

FIG. 7A is the cross-sectional view of an array of cells, which demonstrates the true white state. When the white particles in all cells migrate to the top of the cells, the resulting color (i.e., white) is seen from the top through the transparent conductor film (not shown). FIG. 7B is the top view of the array of cells showing the true white state.

A true black state can be achieved by, for example, a two-step driving process. In the first step, the voltage of the row electrode (63) is set high and the voltages of the column electrode (65) and the two in-plane electrodes (64) are set low. As a result, white particles are first attracted to the bottom of the cells. In the second step, the voltage of the in-plane electrodes is set low, the voltage of the column electrode is set high, and the row electrode is also set high. Under these settings, the white particles, driven by the electric field, migrate to and cover the sides of the cells, resulting in the black background color being seen through the top transparent conductor film.

Alternatively, a true black state can also be achieved by using a one-step driving process. More specifically, the black color may be seen by setting the row (63) and column (65) electrodes of the selected cells with high voltages, and the in-plane electrodes (64) at a low voltage. The voltages applied to the row and column electrodes may not be the same. This allows the electric field from both the top row electrode (63) and the bottom column electrode (65) to force the particles in the selected cells to move quickly towards the edges of the cells and results in a true black state of high quality.

Figure 8A:
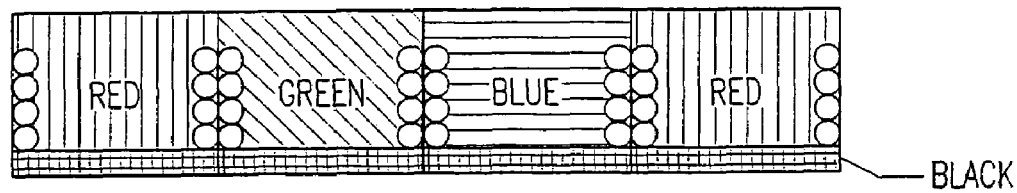
FIGS. 8A and 8B illustrate the true black state of the present invention, the top and cross-section views.
Figure 8B:
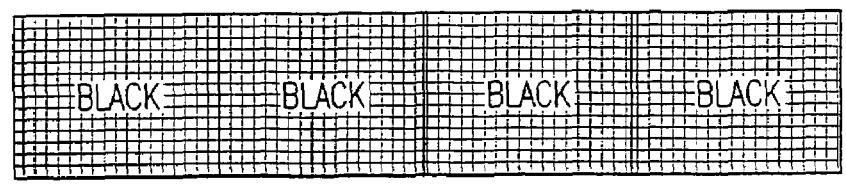

FIG. 8A is the cross-sectional view of the same array of cells (as was shown in FIG. 7A) to demonstrate the true black state of this invention. The white particles in all cells migrate to the sides of the cells, resulting in the color of the background (i.e., black) being seen from the top transparent conductor film. FIG. 8B is the top view of the array of cells showing the true black state.

A colored (e.g., red, blue, or green) state of the selected cells can be achieved when the voltage of a top (row) electrode (63) is set high, and the voltages of a column electrode (65) and the two in-plane electrodes (64) are set low. In this case, the white particles in the cell, driven by the electric field, migrate to the column electrode at the bottom. The bottom of the cells will be covered by the white particles and the color of the dielectric solvent (i.e., red, green or blue) is seen through the top transparent conductor layer. Any color combinations may be achieved according to the present invention by moving the charged white particles in selected cells of a pixel to the bottom. Gray scale can also be obtained by adjusting the voltage to partially move the particles to the bottom column electrodes.

Figure 9A:
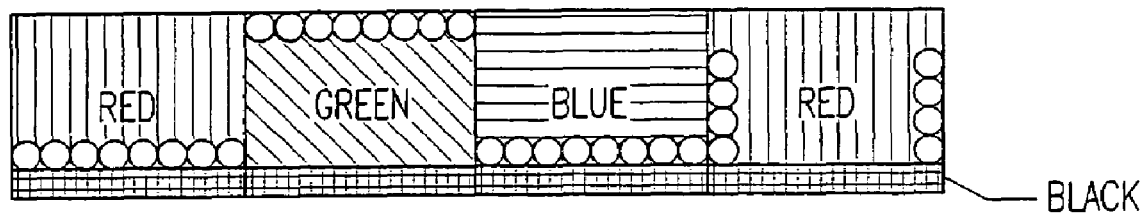
FIGS. 9A and 9B illustrate the multiple color state of the present invention, the top and cross-section views.
Figure 9B:
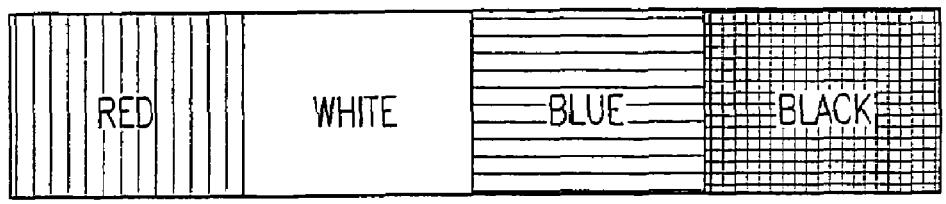

FIG. 9A the cross-sectional view of the same array of cell (as shown in FIGS. 7A and 8A) to demonstrate the white, black and two color states in the same EPD display of the present invention. The cells with the white particles migrated to the top row electrodes (63) show the white color; the cells with the white particles migrated to bottom column electrodes (65) show the color of the dielectric solvent (i.e., red, green or blue); and the cells with the white particles migrated to the sides of the cells show the black color. FIG. 9B is the top view of the array of cells showing multiple colors.

Although the dual switching mode was illustrated above by using two in-plane electrodes (64) in a cell, the same results can also be achieved by using only one in-plane electrode or multiple in-plane electrodes.

IV(b) TFT Active Matrix (1) Electrode Circuit Design

Figure 10A:
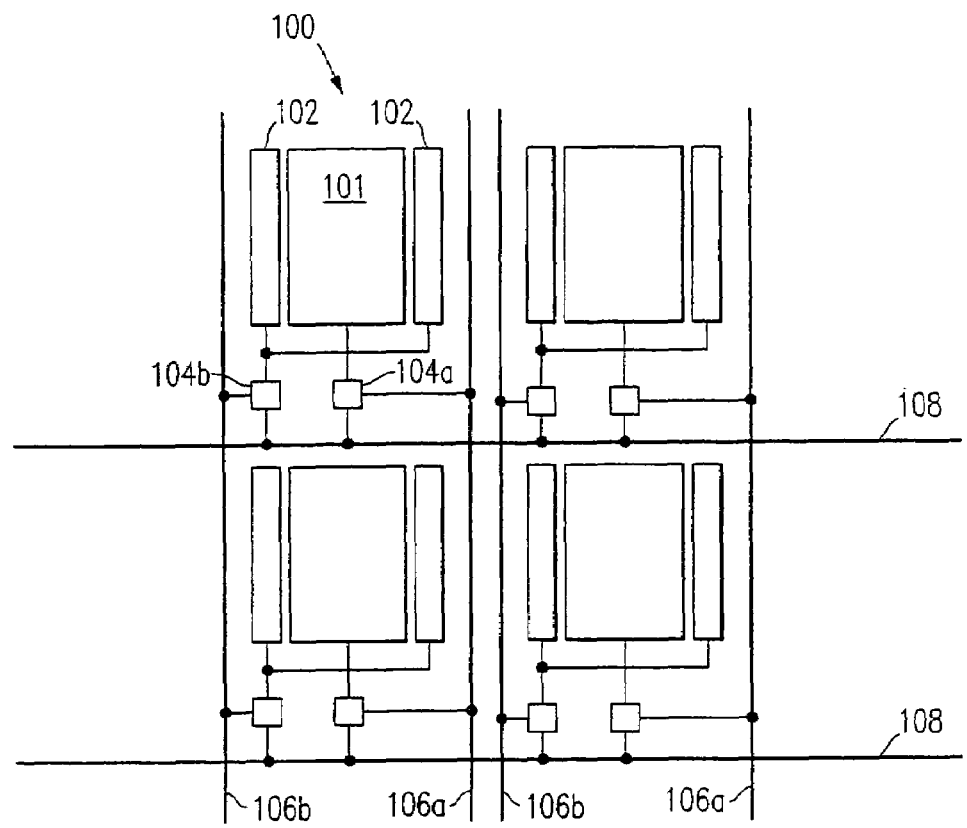
FIGS. 10A-10E illustrate the TFT active driving mechanism.
Figure 10B:
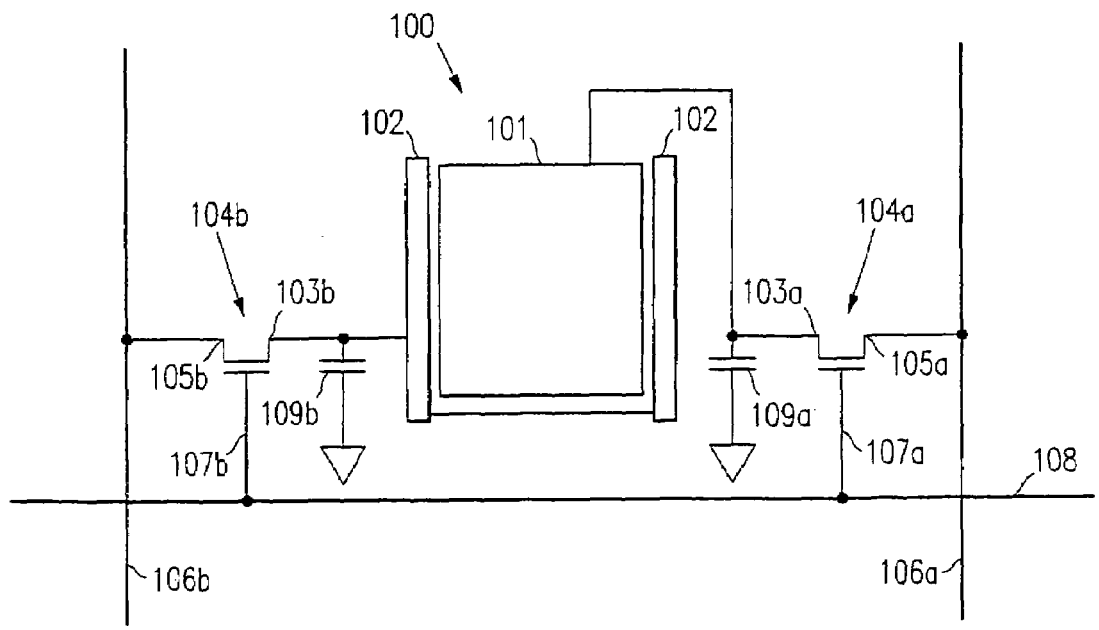

TFT (Thin Film Transistor) Active Matrix used in the LCD display system has been disclosed in U.S. Pat. No. 5,132,820. Such TFT technology can also be applied to the dual-mode EPD of the present invention. In a preferred embodiment, the top layer electrode made of a transparent conductive material, such as ITO, is in one piece which covers the entire top surface of the display. The top electrode connects to ground (0V). FIG. 10A shows the top view of the bottom electrode layer of a 2×2 array of cells. FIG. 10B shows the details of the TFT connection. Each cell (100) comprises one bottom electrode (101) and two in-plane electrodes (102). Each of the bottom electrodes connects to the drain (103a) of a TFT (104a). The in-plane electrodes of each cell connect to the drain (103b) of another TFT (104b). The sources (105a and 105b) of the TFTs (104a and 104b) connect to signal lines (106a and 106b) which run vertically through the bottom surface of the device. The gates (107a and 107b) of the TFTs (104a and 104b) connect to a scan line (108), which runs horizontally through the bottom surface of the device. The scan and signal lines form a matrix structure, but they are insulated from each other.

In the dual-mode switching, two TFTs (104a and 104b) are required for each cell to control the bottom electrode (101) and the in-plane electrodes (102) independently. When a row of cells (100) are scanned, the scan line (108) applies a voltage to the gates (107a and 107b) of the TFTs (104a and 104b) on that row of cells which turn on the TFTs. At the same time, signals for each electrode are applied at signal lines (106a and 106b), which are connected to the sources (105a and 105b) of the TFTs. These signals are then switched to the drains (103a and 103b) of the TFTs, which are connected to the bottom electrode and in-plane electrodes respectively. The signals form the desired bias condition of each cell. Storage capacitors (109a and 109b) are added to hold the voltages, so the voltages at the electrodes continue providing the bias to the cell even after the switching. This driving scheme speeds up the switching time dramatically. In addition, after the storage capacitors (109a and 109b) are charged, the driver can continue switching the next row. The switching time for each row of electrodes is only the charging time for the storage capacitors. This greatly reduces the response time of the display.

(2) Driving Timing Sequences

To illustrate the dual mode switching of this invention, electrophoretic cells comprising a common black background and positively charged white particles dispersed in a clear colored solvent are used.

Figure 10C:
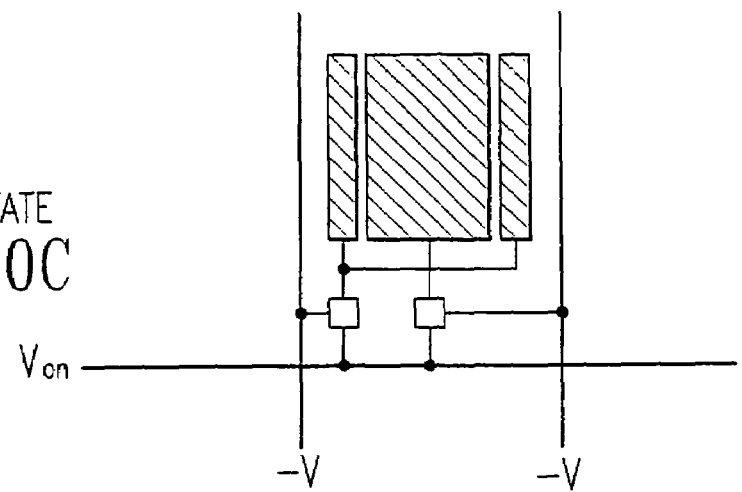

In a preferred embodiment, the top electrode of the device is permanently connected to ground (0V). As illustrated in FIG. 10C, the scan line is set at a voltage, Von, to turn on all the TFTs on the scanning row. Voltages at the signal lines are then switched to the bottom electrode and the in-plane electrodes. When the bottom electrode and in-plane electrodes are both set at a negative voltage, particles in the cell move to the bottom surface of the cell. The bottom of the cell will be covered by the white particles and the color of the dielectric solvent (i.e., red, green or blue) is seen through the top transparent conductor layer.

Figure 10D:
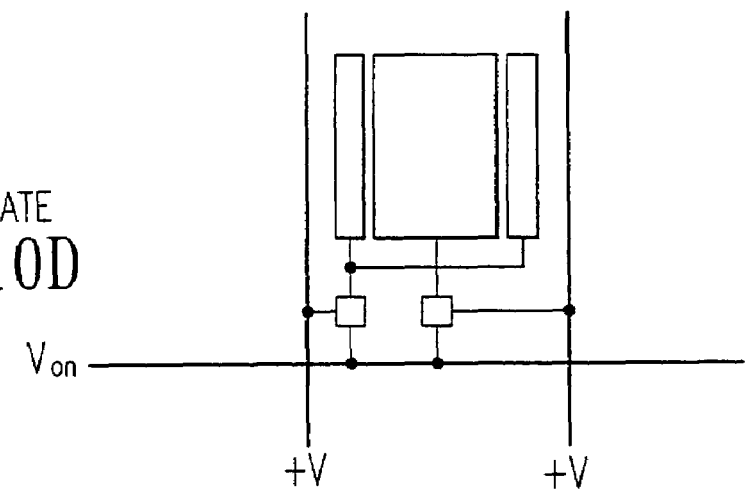

As illustrated in FIG. 10D, when the bottom electrode and in-plane electrodes are both set at a positive voltage, particles in the cell move to the top surface of the cell. When the white particles in the cell migrate to the top of the cell, the resulting white color is seen from the top through the conductor layer.

Figure 10E:
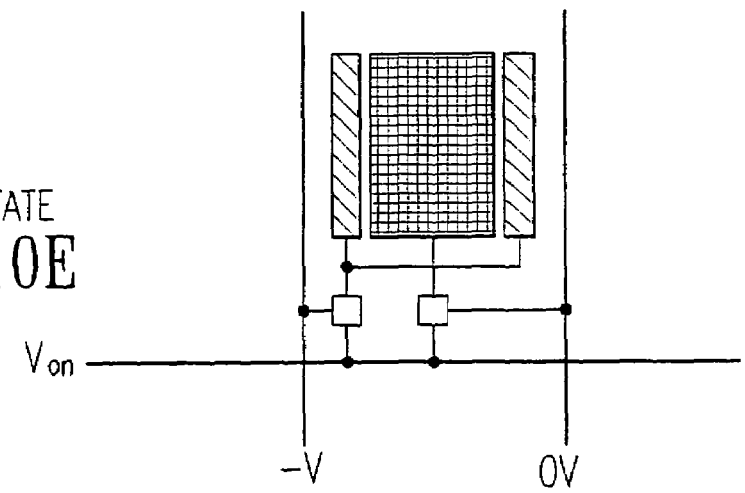

As illustrated in FIG. 10E, when the bottom electrode is set at 0V, and the in-plane electrodes are set at a negative voltage, particles move to the area of the small in-plane electrodes, resulting in the black background color being seen through the top transparent conductor film.

After a row of cells are scanned, the storage capacitors of each cell are charged according to the signal line voltage. When a row of cells are not being scanned, it is in the non-scan phase. During the non-scan phase, the electrode with a voltage set by the storage capacitor continues to generate the electric field and control the movement of particles.

The scan time limit of this design is determined by the storage capacitor discharge time. The capacitor needs to be refreshed (recharged) before the voltage drops more than 10% to maintain a good bias voltage. The display response (on/off) time is determined by the pixel on/off time, because each pixel can be quickly charged and refreshed. Thus, the line to line scan delay can be eliminated.

IV(c) Combination of Passive Matrix and TFT Active Matrix (1) Electrode Circuit Design In this novel design, both the passive matrix electrodes and the TFT active matrix are used in the driving electrode design. FIG. 11A shows the top view and FIG. 11B shows the side view of the driving circuit design. The bottom electrode layer (117) comprises the bottom column electrode (111) and in-plane electrodes (112). The in-plane electrodes of each cell is connected to the drain of a TFT (113). The source of the TFT is connected to a signal line (114) which runs vertically through the bottom surface of the device. The gate of the TFT is connected to a scan line (115) which runs horizontally through the bottom surface of the device. The scan and signal lines form a matrix structure, but the two types of lines are insulated from each other. The cells (110) are sandwiched between one top layer (116) and a bottom layer (117). The horizontal bars are the top row electrodes (118) that are transparent and run through the top of the cells (110). There is a gap (119) separating the two in-plane electrodes (112) and the column electrode (111). The cross section of the top row electrode, the bottom column electrode, and the in-plane electrodes define the display cell.

The top row electrodes (118) and bottom column electrodes (111) form the passive matrix which controls the movement of particles in the up and down direction. The in-plane electrodes (112) and the bottom column electrode (111) provide the bias voltage for the in-plane movement of the particles. The in-plane electrodes are controlled by the TFT active matrix.

(2) Driving Timing Sequences

To illustrate the dual mode switching of this invention, electrophoretic cells comprising a common black background and positively charged white particles dispersed in a clear colored solvent are used.

As illustrated in FIG. 11C, the scan signal is set at a voltage, Von, to turn on all the TFTs on the scanning row. Voltages at the signal lines are then switched to the in-plane electrodes. When the bottom column electrode and in-plane electrodes are both set at a low voltage and the top row electrode is set at a high voltage, particles in the cell move to the bottom surface of the cell. The bottom of the cells consequently is covered by the white particles and the color of the dielectric solvent (i.e., red, green or blue) is seen through the top transparent conductor layer.

Figures 1, 11D:
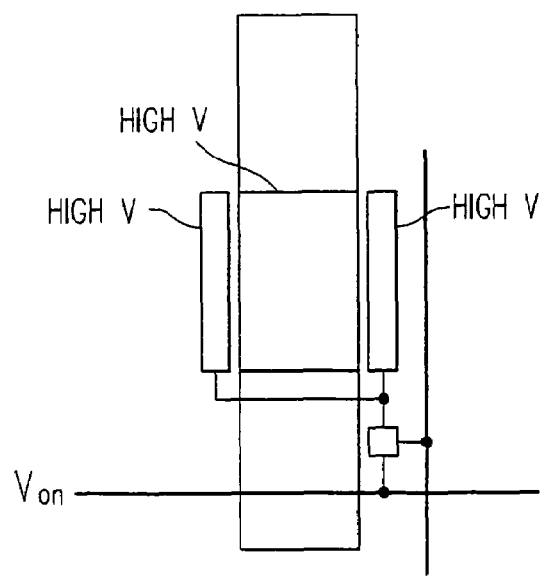
Figures 2, 11D:
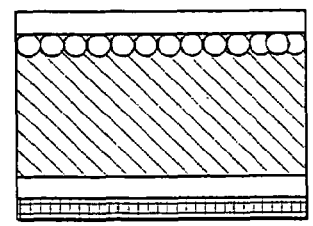

As illustrated in FIG. 11D, when the bottom electrode and in-plane electrodes are both set at a high voltage and the top row electrode is set at a low voltage, particles in the cell move to the top surface of the cell. When the white particles in the cell migrate to the top of the cell, the white color is seen from the top and the cell is in the white state.

Figures 1, 11E:
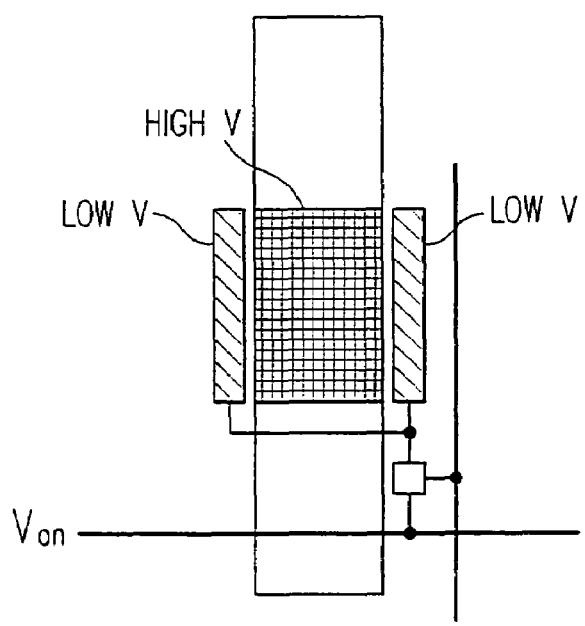
Figures 2, 11E:
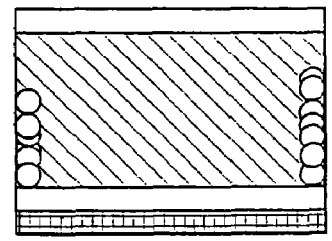

As illustrated in FIG. 11E, when the top row electrode and bottom column electrode are set at a high voltage and the in-plane electrodes are set at a low voltage, particles move to the area of the small in-plane electrodes, resulting in the black background color being seen through the top transparent conductor film.

This design has the advantage of reducing the in-plane switching time. As the in-plane electrodes are controlled by the TFTs, the storage capacitor holds the voltage on the in-plane electrodes. During the non-scan phase, the electrode with a voltage set by the storage capacitor continues to generate the electric field and control the movement of particles. This effectively reduces the cell switching time.

Figure 12A:
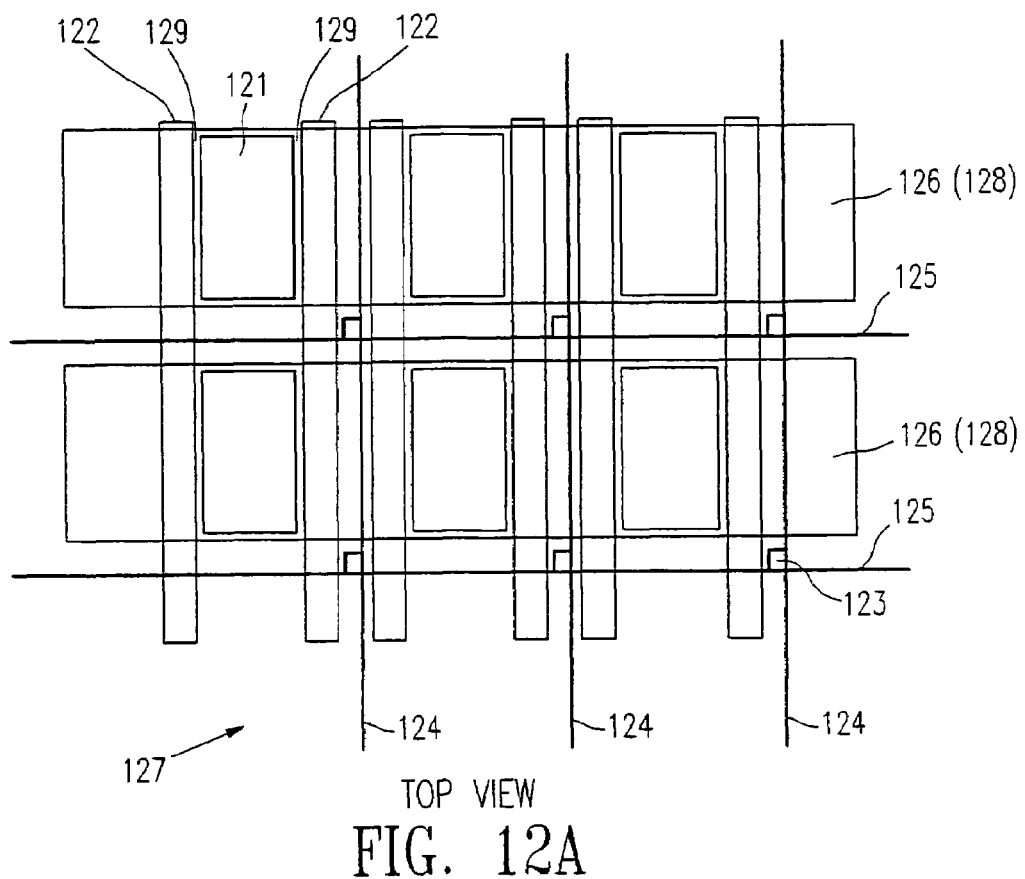
FIGS. 12A-12E illustrate an alternative combination of the active and passive driving mechanisms.
Figure 12B:
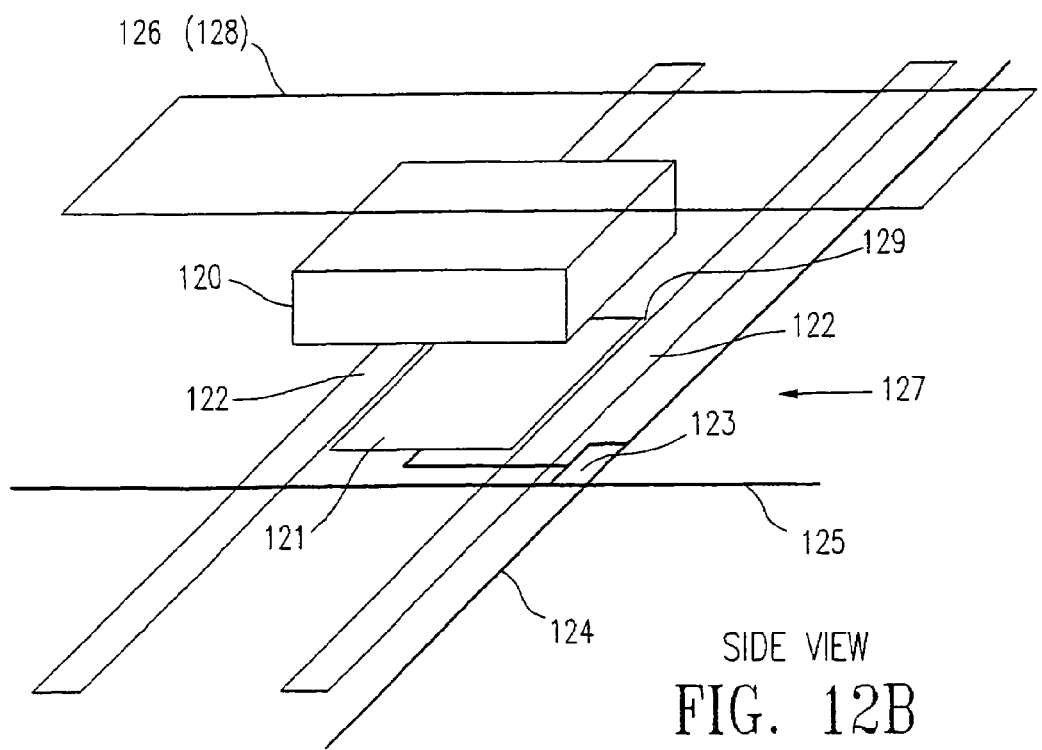

IV(d) Alternative Combination of Passive Matrix and TFT Active Matrix (1) Electrode Circuit Design In another novel design, both the passive matrix electrodes and TFT active matrix are used in the driving electrode design. FIG. 12A shows the top view and FIG. 12B shows the side view of the driving circuit design. The bottom electrode layer (127) comprises bottom column electrode (121) and in-plane electrode (122). The bottom electrode of each cell connects to the drain of a TFT (123). The source of the TFT connects to a signal line (124), which runs vertically through the bottom surface of the device. The gate of the TFT connects to a scan line (125), which runs horizontally through the bottom surface of the device. The scan and signal lines form a matrix structure, but they are insulated from each other. The cells (120) are sandwiched between a top layer (126) and a bottom layer (127). The horizontal bars are the top row electrodes (128) that are transparent and run through the top of the cells. There is a gap (129) separating the two in-plane electrodes (122) and the bottom electrode (121). The cross section of the top row electrode, the bottom electrode, and the in-plane electrodes define the display cell.

The top row electrodes and the in-plane electrodes form the passive matrix. The in-plane electrodes and the bottom electrode provide the bias voltage for the in-plane movement of the particles. The bottom electrodes are controlled by the TFT active matrix.

(2) Driving Timing Sequences

To illustrate the dual mode switching of this invention, electrophoretic cells comprising a common black background and positively charged white particles dispersed in a clear colored solvent are used.

Figures 1, 12C:
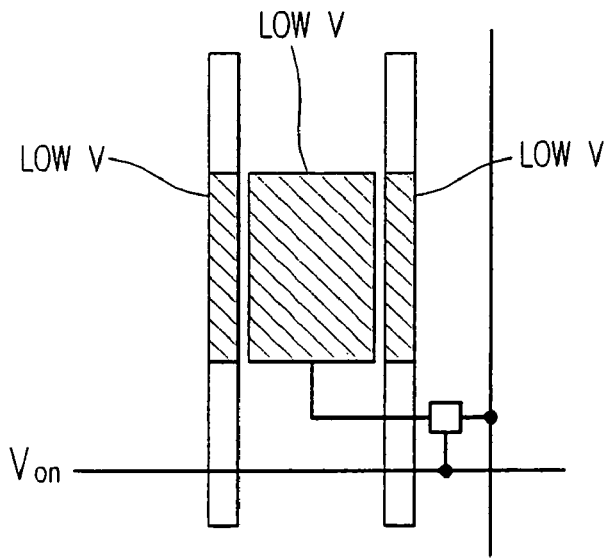
Figures 2, 12C:
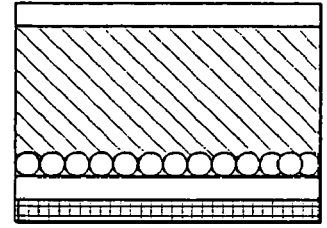

As illustrated in FIG. 12C, the scan signal is set at a voltage, Von, to turn on all the TFTs on the scanning row. Voltages at the signal lines are then switched to the bottom electrode. When the bottom electrode and in-plane electrodes are both set at a low voltage, and the top row electrode is set at a high voltage, particles in the cell move to the bottom surface of the cell. The bottom of the cells will be covered by the white particles and the color of the dielectric solvent (i.e., red, green or blue) is seen through the top transparent conductor layer.

Figures 1, 12D:
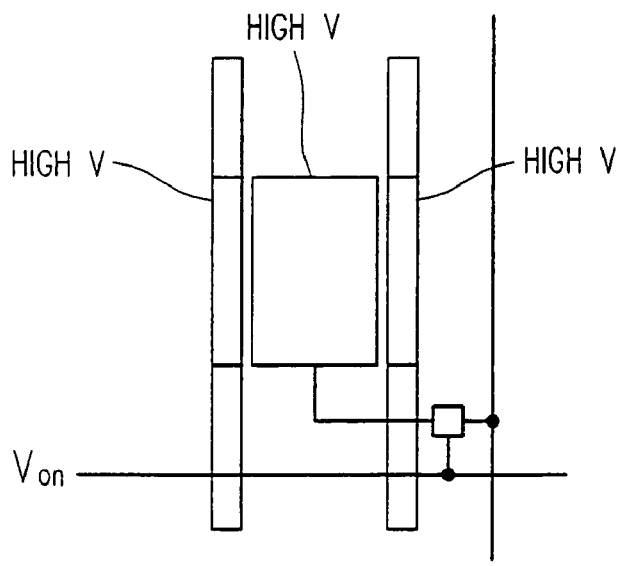
Figures 2, 12D:
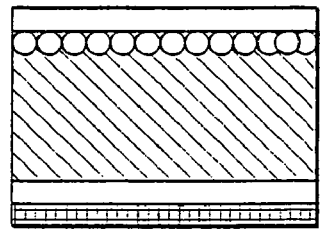

As illustrated in FIG. 12D, when the bottom electrode and in-plane electrodes are both set at a high voltage, and the top row electrode is set at a low voltage, particles in the cell move to the top surface of the cell. When the white particles in the cell migrate to the top of the cell, the resulting white color is seen from the top and the pixel is in the white state.

Figures 1, 12E:
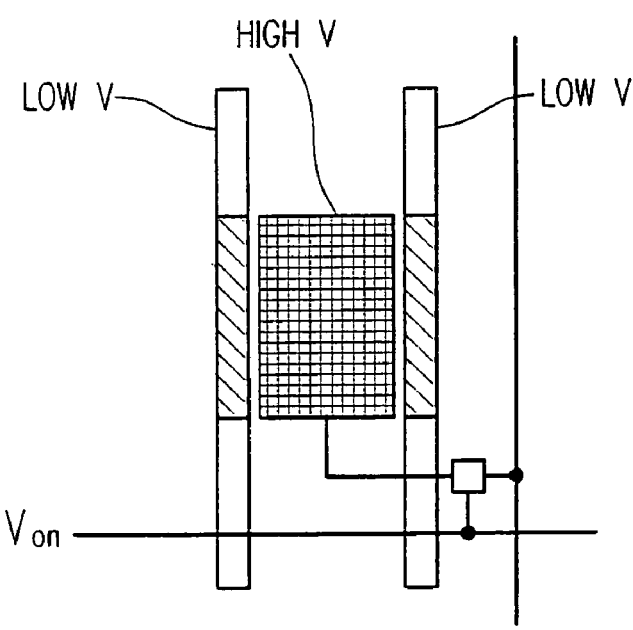
Figures 2, 12E:
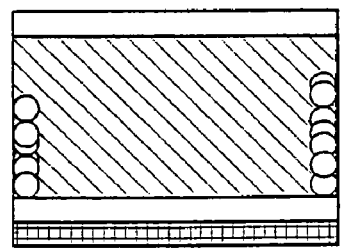

As illustrated in FIG. 12E, when the top row electrode and bottom column electrode are set at a high voltage, and the in-plane electrodes are set at a low voltage, particles move to the area of the small in-plane electrodes, resulting in the black background color being seen through the top transparent conductor film.

This design has the advantage of reducing the up-down switching time. As the bottom electrode is controlled by the TFTs, the storage capacitor holds the voltage on the bottom electrode. During the non-scan phase, the electrode with a voltage set by the storage capacitor continues to generate the electric field and control the movement of the particles. This effectively reduces the cell switching time.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. An electrophoretic display comprising electrophoretic cells wherein each of said electrophoretic cells is sandwiched between a top layer comprising a top electrode and a bottom layer comprising a bottom electrode and at least one in-plane electrode, and each of said electrophoretic cells comprises
   (i) partition walls,
   (ii) an electrophoretic composition filled therein, said electrophoretic composition comprises charged pigment particles dispersed in a dielectric solvent or solvent mixture, and
   (iii) a black matrix layer only on the top surface of the partition walls, and said electrophoretic cell is capable of displaying three color states: the color of the charged pigment particles, the color of the dielectric solvent or solvent mixture, or the color of a cell background layer.

2. The electrophoretic display of claim 1 wherein said pigment particles carry the same charge polarity.

3. The electrophoretic display of claim 1 wherein each of said electrophoretic cells further comprises a top sealing layer enclosing said electrophoretic composition within said electrophoretic cell.

4. The electrophoretic display of claim 3 wherein said top sealing layer is formed from a sealing composition having a specific gravity lower than that of the electrophoretic composition.

5. The electrophoretic display of claim 3 wherein said top sealing layer is hardened in situ.

6. The electrophoretic display of claim 1 wherein said black matrix layer is applied by printing, stamping or photolithography.

7. The electrophoretic display of claim 1 wherein said black matrix layer is applied by vapor deposition or sputtering with a shadow mask.

8. The electrophoretic display of claim 1 wherein the optical density of said black matrix layer is higher than 0.5.

9. The electrophoretic display of claim 1 wherein the thickness of said black matrix layer is in the range of from 0.005 μm to 5 μm.

10. The electrophoretic display of claim 1 further comprising a diffuser layer placed directly or indirectly above the black matrix layer.

11. The electrophoretic display of claim 1 wherein said black matrix layer is a highly crosslinked black matrix layer.

12. The electrophoretic display of claim 1 wherein said partition walls are opaque.

13. The electrophoretic display of claim 12 wherein said partition walls are white opaque.

14. The electrophoretic display of claim 12 wherein said partition walls are gray opaque.

15. The electrophoretic display of claim 1 wherein said partition walls are colored.

16. The electrophoretic display of claim 1 wherein the inside surface of the partition walls is of the same color as the electrophoretic composition.

17. The electrophoretic display of claim 16 wherein the two sides of a partition wall are of different colors.

18. The electrophoretic display of claim 12 wherein each of said electrophoretic cells further comprises a top sealing layer enclosing said electrophoretic composition within said electrophoretic cell.

19. The electrophoretic display of claim 18 wherein said top sealing layer is formed from a sealing composition having a specific gravity lower than that of the electrophoretic composition.

20. The electrophoretic display of claim 18 wherein said top sealing layer is hardened in situ.

21. The electrophoretic display of claim 1 wherein said cell background layer is on top of said bottom layer or underneath said bottom layer.

22. The electrophoretic display of claim 1 wherein said bottom layer serves as the cell background layer.

23. The electrophoretic display of claim 2 wherein said pigment particles are of the same color.

24. The electrophoretic display of claim 1 wherein the electrophoretic cell displays (i) the color of the charged pigment particles when the charged pigment particles migrate to the top electrode, or (ii) the color of the cell background layer when the charged pigment particles migrate to the at least one in-plane electrode, or (iii) the color of the dielectric solvent or solvent mixture when the charged pigment particles migrate to the bottom electrode.

25. An electrophoretic display comprising electrophoretic cells wherein each of said electrophoretic cells is sandwiched between
   (a) a top layer comprising a top electrode layer and a top substrate layer wherein said top electrode layer comprises a top electrode, and
   (b) a bottom layer comprising a bottom electrode layer and a bottom substrate layer wherein said bottom electrode layer comprises a bottom electrode and at least one in-plane electrode,
   and each of said electrophoretic cells comprises
   (i) partition walls,
   (ii) an electrophoretic composition filled therein which electrophoretic composition comprises charged pigment particles dispersed in a dielectric solvent or solvent mixture,
   (iii) a top sealing layer enclosing said electrophoretic composition within said electrophoretic cell, and
   (iv) optionally an adhesive layer, and said electrophoretic display further comprises a black matrix layer on said top sealing layer, or said adhesive layer, or said top electrode layer, or said top substrate layer, or said bottom electrode layer or said bottom substrate layer in areas corresponding to the top surface of the partition walls, and said electrophoretic cell is capable of displaying three color states: the color of the charged pigment particles, the color of the dielectric solvent or solvent mixture, or the color of a cell background layer.

26. The electrophoretic display of claim 25 wherein said pigment particles carry the same charge polarity.

27. The electrophoretic display of claim 25 wherein said top sealing layer is formed from a sealing composition having a specific gravity lower than that of the electrophoretic composition.

28. The electrophoretic display of claim 27 wherein said top sealing layer is hardened in situ.

29. The electrophoretic display of claim 25 wherein said black matrix layer is on the top sealing layer.

30. The electrophoretic display of claim 25 wherein said black matrix layer is on the top electrode layer or on the bottom electrode layer.

31. The electrophoretic display of claim 25 wherein said adhesive layer is between said top sealing layer and said top electrode layer.

32. The electrophoretic display of claim 25 wherein said black matrix layer is on the adhesive layer.

33. The electrophoretic display of claim 25 wherein said black matrix layer is on said top substrate layer or on said bottom substrate layer.

34. The electrophoretic display of claim 25 wherein said black matrix layer is applied by printing, stamping or photolithography.

35. The electrophoretic display of claim 25 wherein said black matrix layer is applied by vapor deposition or sputtering with a shadow mask.

36. The electrophoretic display of claim 25 wherein the optical density of said black matrix layer is higher than 0.5.

37. The electrophoretic display of claim 25 wherein the thickness of said black matrix layer is in the range of from 0.005 μm to 5 μm.

38. The electrophoretic display of claim 25 further comprising a diffuser layer placed directly or indirectly above the black matrix layer.

39. The electrophoretic display of claim 25 wherein said partition walls are opaque.

40. The electrophoretic display of claim 39 wherein said top sealing layer is formed from a sealing composition having a specific gravity lower than that of the electrophoretic composition.

41. The electrophoretic display of claim 39 wherein said top sealing layer is hardened in situ.

42. The electrophoretic display of claim 26 wherein said pigment particles are of the same color.

43. An electrophoretic display comprising electrophoretic cells wherein each of said electrophoretic cells is sandwiched between a top electrode layer comprising a top electrode and a bottom electrode layer comprising a bottom electrode and at least one in-plane electrode, and each of said electrophoretic cells comprises
   (i) partition walls,
   (ii) an electrophoretic composition filled therein, said electrophoretic composition comprises charged pigment particles dispersed in a dielectric solvent or solvent mixture, and
   (iii) a black matrix layer between the electrophoretic cell and the bottom electrode layer, wherein said black matrix layer is in areas corresponding to the top surface of the partition walls, and said electrophoretic cell is capable of displaying three color states: the color of the charged pigment particles, the color of the dielectric solvent or solvent mixture, or the color of a cell background layer.

44. The electrophoretic display of claim 43 wherein said pigment particles carry the same charge polarity.

45. The electrophoretic display of claim 43 wherein each of said electrophoretic cells further comprising a top sealing layer enclosing said electrophoretic composition within said electrophoretic cell.

46. The electrophoretic display of claim 45 wherein said top sealing layer is formed from a sealing composition having a specific gravity lower than that of the electrophoretic composition.

47. The electrophoretic display of claim 45 wherein said top sealing layer is hardened in situ.

48. The electrophoretic display of claim 43 wherein said black matrix layer is applied by printing, stamping or photolithography.

49. The electrophoretic display of claim 43 wherein said black matrix layer is applied by vapor deposition or sputtering with a shadow mask.

50. The electrophoretic display of claim 43 wherein the optical density of said black matrix layer is higher than 0.5.

51. The electrophoretic display of claim 43 wherein the thickness of said black matrix layer is in the range of from 0.005 μm to 5 μm.

52. The electrophoretic display of claim 43 wherein said partition walls are opaque.

53. The electrophoretic display of claim 44 wherein said pigment particles are of the same color.

* * * * *